(12) United States Patent
Okazaki

(10) Patent No.: US 10,490,798 B2
(45) Date of Patent: Nov. 26, 2019

(54) BATTERY PACK

(71) Applicant: Yazaki Corporation, Tokyo (JP)

(72) Inventor: Yutaro Okazaki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 185 days.

(21) Appl. No.: 15/793,940

(22) Filed: Oct. 25, 2017

(65) Prior Publication Data
US 2018/0145302 A1 May 24, 2018

(30) Foreign Application Priority Data
Nov. 18, 2016 (JP) ................. 2016-225125

(51) Int. Cl.
H01M 2/20 (2006.01)
H01M 2/02 (2006.01)
H01M 2/10 (2006.01)
H01M 2/30 (2006.01)
H01M 10/42 (2006.01)
H01M 10/6554 (2014.01)
H01M 6/42 (2006.01)
H02H 7/18 (2006.01)

(52) U.S. Cl.
CPC ......... *H01M 2/202* (2013.01); *H01M 2/1077* (2013.01); *H01M 2/1083* (2013.01); *H01M 2/30* (2013.01); *H01M 10/425* (2013.01); *H01M 10/6554* (2015.04); *H01M 6/42* (2013.01); *H02H 7/18* (2013.01)

(58) Field of Classification Search
CPC ............ H01M 2/02; H01M 2/20; H01M 2/10; H01M 2/30; H01M 10/42
See application file for complete search history.

(56) References Cited

U.S. PATENT DOCUMENTS

| 2005/0202315 A1* | 9/2005 | Sugeno | H01M 2/0242 429/156 |
| 2008/0084182 A1* | 4/2008 | Oberlin | H01M 10/052 320/116 |
| 2018/0331440 A1* | 11/2018 | Okamoto | H01M 2/10 |

FOREIGN PATENT DOCUMENTS

| JP | 2015-207393 A | 11/2015 | |
| JP | 2016-115616 A | 6/2016 | |
| WO | WO-2016098607 A1 * | 6/2016 | H01M 2/20 |

* cited by examiner

Primary Examiner — Kenneth J Douyette
(74) Attorney, Agent, or Firm — Kenealy Vaidya LLP

(57) ABSTRACT

A conductive module includes a first conductive member electrically connected to an electrode terminal of a battery cell; a second conductive member that electrically connects a battery monitoring unit monitoring a battery state to the first conductive member; a circuit protection member arranged between the first conductive member and the second conductive member; a first electrical connection structural body electrically connecting the first conductive member and the circuit protection member; a second electrical connection structural body electrically connecting the second conductive member and the circuit protection member; a housing member housing the circuit protection member and the first and second electrical connection structural bodies; and a mounting structure that mounts the housing member to an insulating member with the insulating member sandwiching the battery cell as a mounting target. The mounting structure includes a conductor-side engagement body which is an engagement body provided in the housing member.

9 Claims, 14 Drawing Sheets

US 10,490,798 B2

BATTERY PACK

CROSS-REFERENCE TO RELATED APPLICATION(S)

The present application claims priority to and incorporates by reference the entire contents of Japanese Patent Application No. 2016-225125 filed in Japan on Nov. 18, 2016.

BACKGROUND OF THE INVENTION

1. Field of the Invention

The present invention relates to a conductive module and a battery pack.

2. Description of the Related Art

Conventionally, a battery pack including a plurality of battery cells has been mounted in vehicles such as electric automobiles and hybrid cars, and a battery monitoring unit configured to monitor each battery state of the battery cells has been provided therein. In addition, a conductive module is used to electrically connect the battery cell side and the battery monitoring unit side so as to send a signal relating to the battery state to an arithmetic processing device of the battery monitoring unit, at the time of monitoring. The conductive module includes a first conductive member electrically connected to an electrode terminal side of the battery cell, a second conductive member electrically connected to the battery monitoring unit side, and a circuit protection member including a fuse element interposed between the first conductive member and the second conductive member. For example, the following Japanese Patent Application Laid-open No. 2015-207393 and Japanese Patent Application Laid-open No. 2016-115616 disclose a bus bar as a first conductive member connecting electrode terminals of adjacent battery cells to each other, an electric wire as a second conductive member, and a fuse unit enclosing a circuit protection member.

Meanwhile, a plurality of battery cells are arranged as an aggregate in the battery pack, and a plurality of conductive modules are provided along the arrangement direction thereof so as to monitor each battery state of the plurality of battery cells. A case made of synthetic resin is provided to collectively attach the respective conductive modules to a battery module (an aggregate of the plurality of battery cells) in the related art. Thus, it is difficult to miniaturize a size of the battery pack of the related art due to the interposition of the case.

SUMMARY OF THE INVENTION

Accordingly, an object of the present invention is to provide a conductive module capable of miniaturizing a size of a battery pack, and a battery pack provided with the conductive module.

In order to achieve the above mentioned object, a conductive module according to one aspect of the present invention includes a first conductive member that is electrically connected to at least one of a plurality of arranged battery cells as a connection target by being directly or indirectly mounted to one of two electrode terminals included in the battery cell being the connection target; a second conductive member that electrically connects an arithmetic processing device of a battery monitoring unit to the first conductive member, the battery monitoring unit monitoring a battery state of the battery cell; a circuit protection member that includes a first electrical connection portion electrically connected to an electrical connection portion of the first conductive member, a second electrical connection portion electrically connected to an electrical connection portion of the second conductive member, and a fuse element arranged between the first electrical connection portion and the second electrical connection portion; a first electrical connection structural body that electrically connects the electrical connection portion of the first conductive member and the first electrical connection portion between the first conductive member and the circuit protection member; a second electrical connection structural body that electrically connects the electrical connection portion of the second conductive member and the second electrical connection portion between the second conductive member and the circuit protection member; a housing member that houses the circuit protection member, the first electrical connection structural body, and the second electrical connection structural body; and a mounting structure that mounts the housing member to an insulating member being a mounting target, the mounting target being at least one of the insulating members sandwiching the battery cell being the connection target in an arrangement direction of the plurality of the battery cells, wherein the mounting structure includes a conductor-side engagement body which is an engagement body provided in the housing member, and is engaged with a battery-side engagement body provided in the insulating member to mount the housing member to the insulating member.

According to another aspect of the present invention, in the conductive module, it is possible to configure that one of the conductor-side engagement body and the battery-side engagement body is formed as a protruding body, and the other of the conductor-side engagement body and the battery-side engagement body is formed as a locking body that suppresses relative movement in a removal direction between the housing member and the insulating member by locking the protruding body.

According to still another aspect of the present invention, in the conductive module, it is possible to configure that the circuit protection member is provided as a circuit protection part enclosing each of the first electrical connection portion and the second electrical connection portion, in the state of being exposed, in an insulating enclosing member, and the housing member includes a protection body housing chamber in which the circuit protection part is housed.

According to still another aspect of the present invention, in the conductive module, it is possible to further include that a linking structure that links the first conductive member and the housing member.

In order to achieve the above mentioned object, a battery pack according to still another aspect of the present invention includes a plurality of arranged battery cells; an insulating member that individually sandwiches the battery cell in an arrangement direction of the plurality of battery cells; and a plurality of conductive modules that electrically connects the battery cell and an arithmetic processing device of a battery monitoring unit monitoring a battery state of the battery cell. The conductive module includes a first conductive member that is electrically connected to at least one of the plurality of battery cells as a connection target by being directly or indirectly mounted to one of two electrode terminals included in the battery cell being the connection target; a second conductive member that electrically connects the arithmetic processing device to the first conductive member; a circuit protection member that includes a first electrical connection portion electrically connected to an electrical connection portion of the first conductive member, a second electrical connection portion electrically connected to an electrical connection portion of the second conductive member, and a fuse element arranged between the first electrical connection portion and the second electrical connection portion; a first electrical connection structural body that electrically connects the electrical connection portion of the first conductive member and the first electrical connection portion between the first conductive member and the circuit protection member; a second electrical connection structural body that electrically connects the electrical connection portion of the second conductive member and the second electrical connection portion between the second conductive member and the circuit protection member; a housing member that houses the circuit protection member and the first electrical connection structural body and the second electrical connection structural body; and a mounting structure that mounts the housing member to an insulating member being amounting target, the mounting target being at least one of the insulating members sandwiching the battery cell being the connection target in an arrangement direction of the battery cells, and the mounting structure includes a conductor-side engagement body which is an engagement body provided in the housing member, and is engaged with a battery-side engagement body provided in the insulating member to mount the housing member to the insulating member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a conductive module and a battery pack according to the present invention will be described in detail with reference to the drawings.

Incidentally, the present invention is not limited by the embodiments.

Embodiments

One of embodiments of the conductive module and the battery pack according to the present invention will be described with reference to FIGS. 1 to 14.

Figure 1:
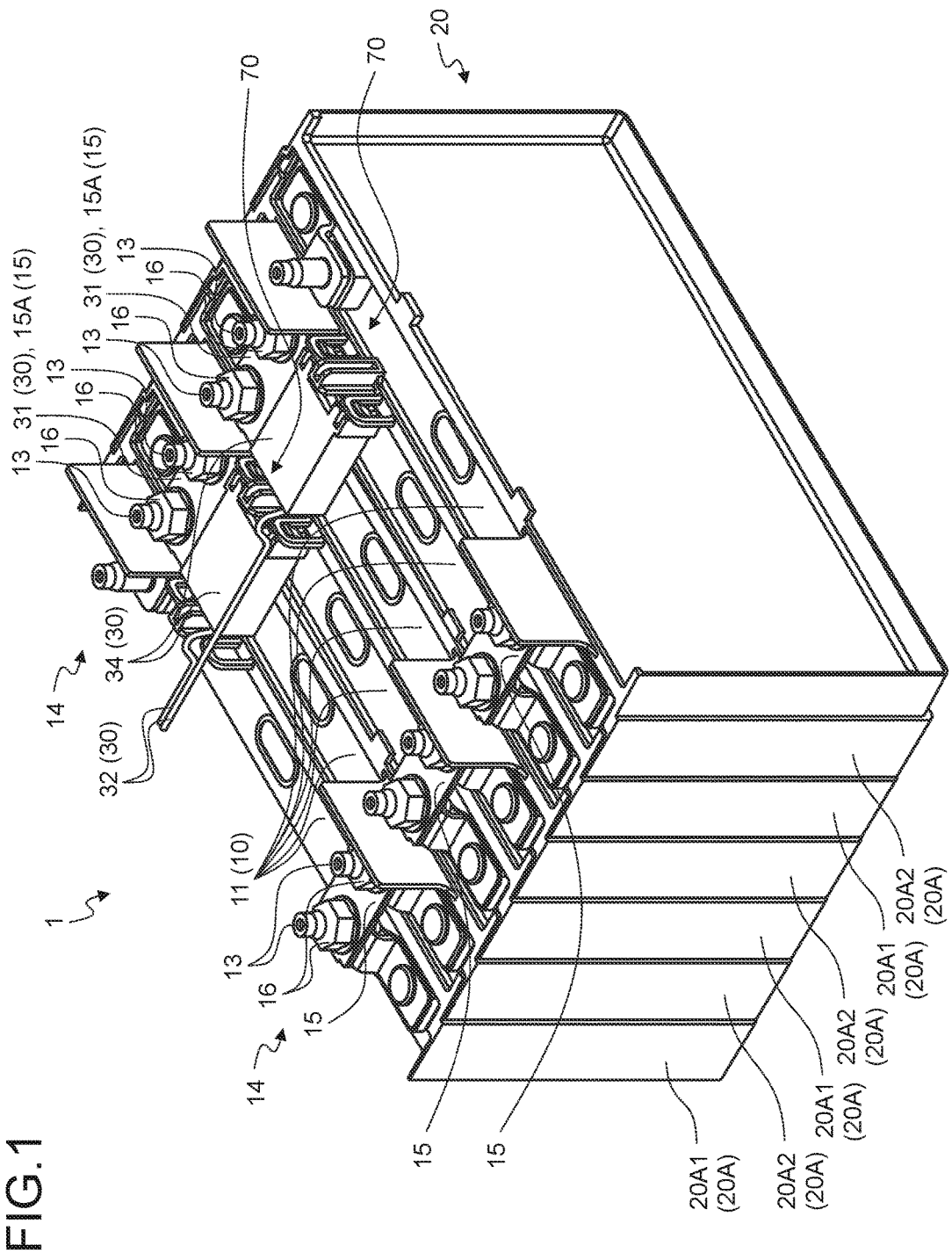
FIG. 1 is a perspective view illustrating a conductive module and a battery pack according to an embodiment.
Figure 2:
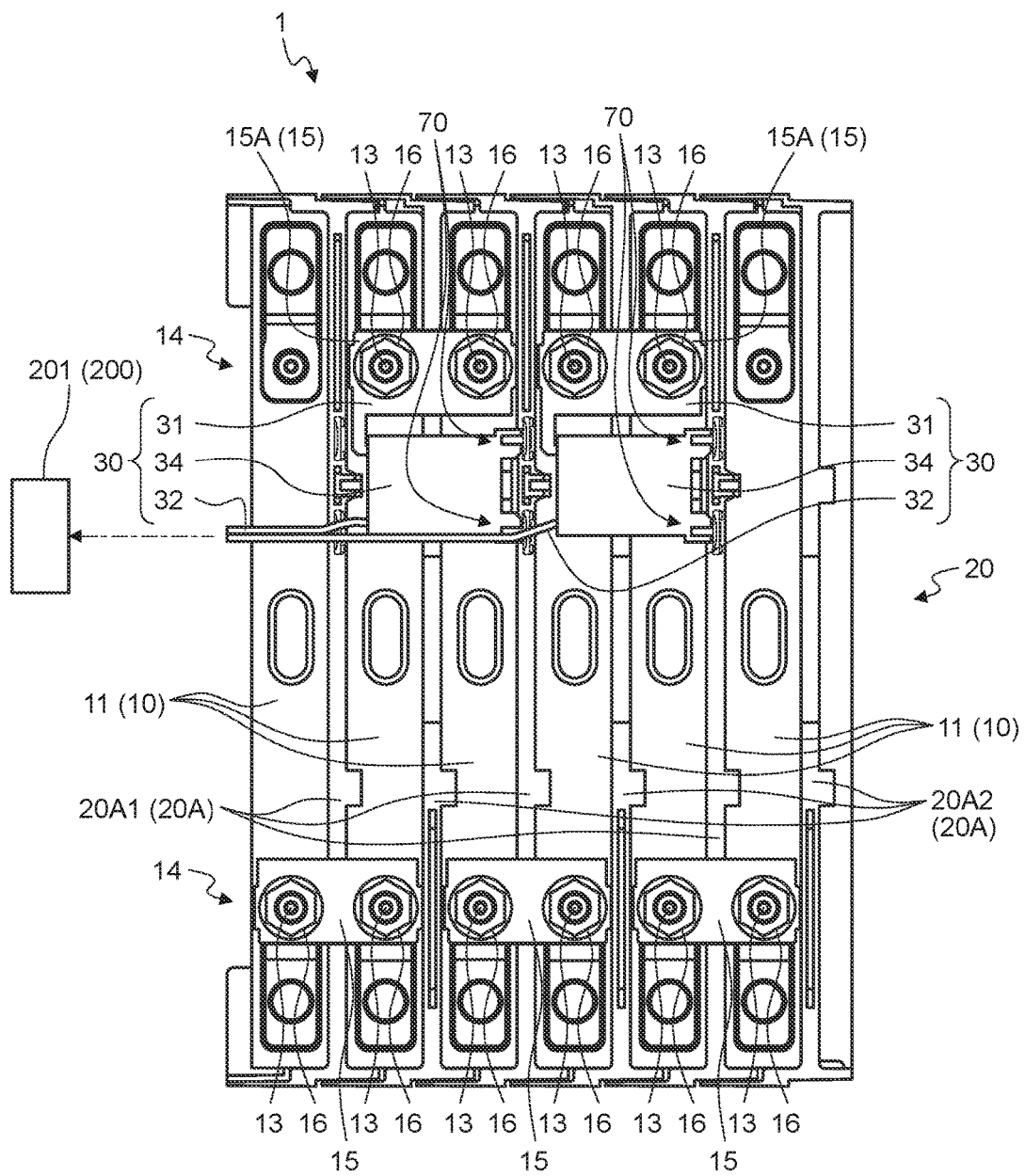
FIG. 2 is a plan view illustrating the conductive module and the battery pack according to the embodiment.
Figure 3:
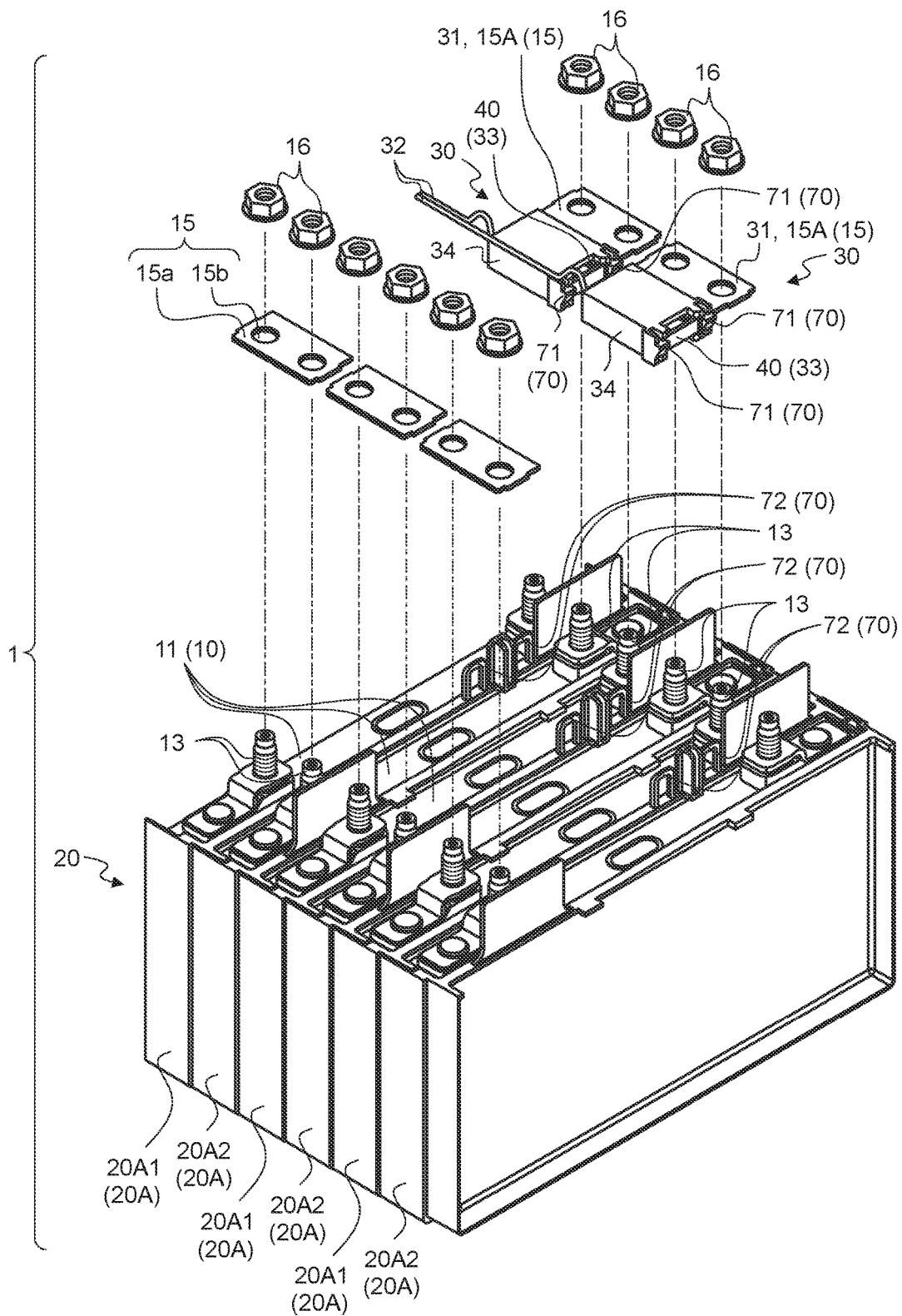
FIG. 3 is an exploded perspective view illustrating a state before assembling the conductive module and a bus bar.

Reference numeral 1 in FIGS. 1 to 3 represents a battery pack according to the present embodiment. Reference numeral 10 represents a battery module of the battery pack 1. Reference numeral 20 represents a holding structural body of a plurality of battery cells 11 arranged to form the battery module 10. Reference numeral 30 represents a conductive module which electrically connects the battery cell 11 to a battery monitoring unit 200 (FIG. 2) that monitors a battery state of the battery cell 11. The battery pack 1 is placed on a vehicle such as an electric automobile and a hybrid car, and includes the battery module 10, the holding structural body 20, and the conductive module 30.

Figure 4:
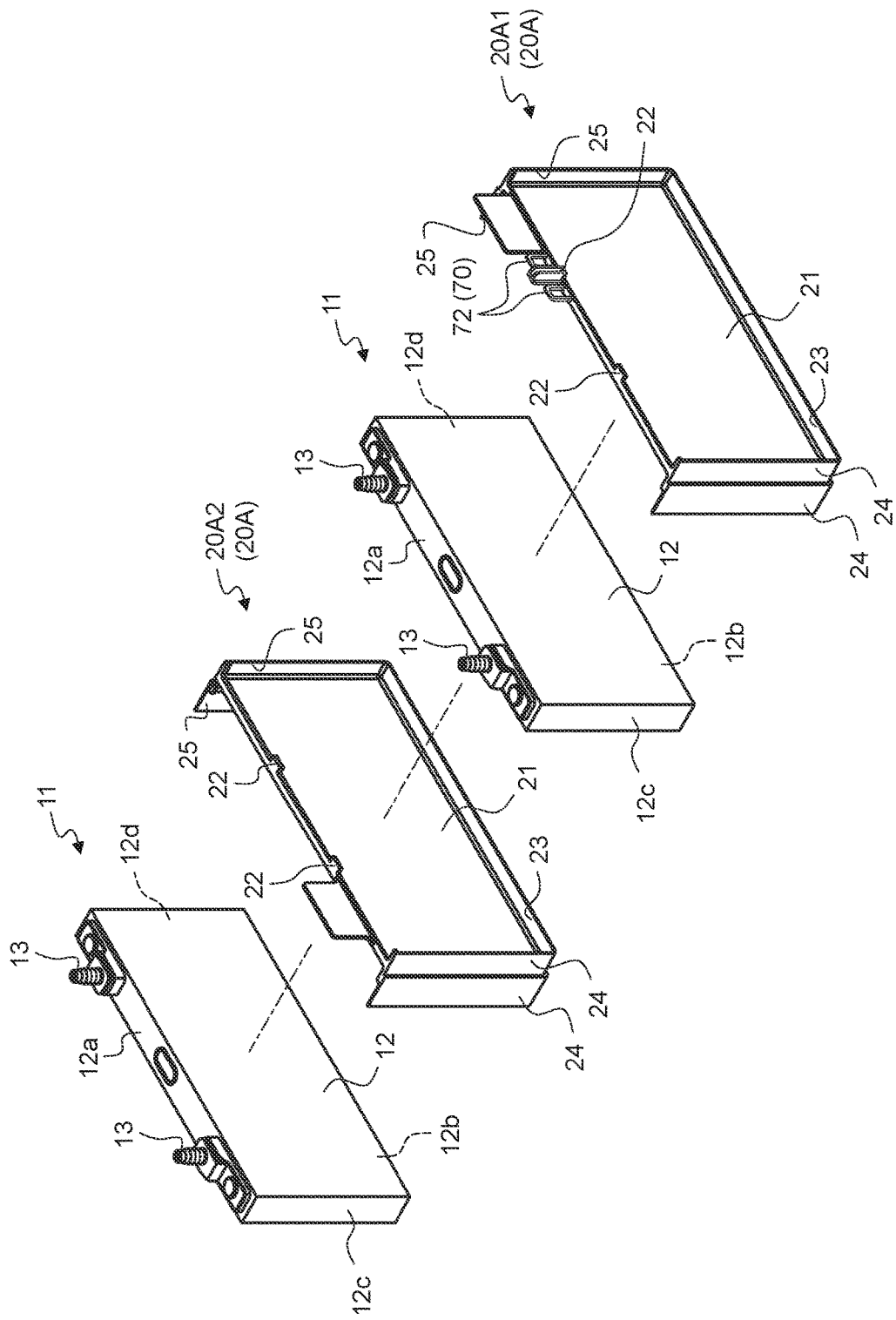
FIG. 4 is an exploded perspective view illustrating a state before assembling a battery cell and an insulating member.
Figure 5:
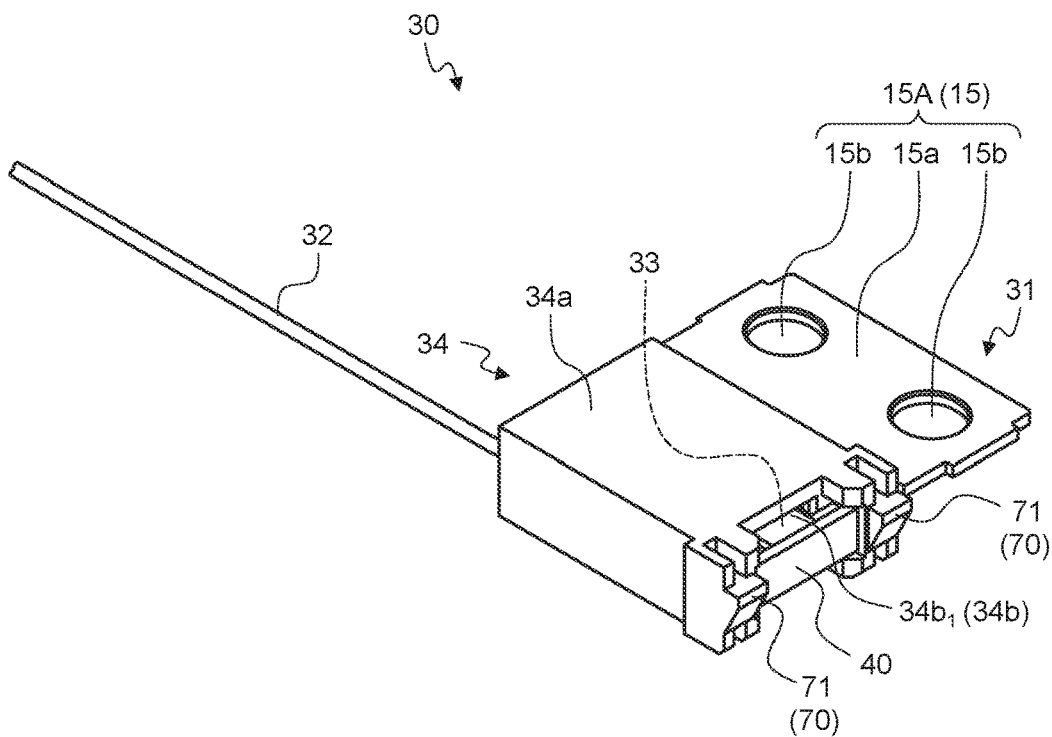
FIG. 5 is a perspective view illustrating the conductive module according to the embodiment.

The battery cell 11 forming the battery module 10 includes a cell body 12 and two electrode terminals 13 (FIG. 4). Each of the electrode terminals 13 is provided at any place of the cell body 12 in the state of being exposed to the outside, one of which serves as a positive electrode and the other of which serves as a negative electrode. Each of the electrode terminals 13 is, for example, a plate-shaped terminal provided on an outer wall surface of the cell body 12, or a columnar electrode post protruding from the outer wall surface of the cell body 12. When the cell body 12 has a plurality of the outer wall surfaces, each of the electrode terminals 13 may be arranged on one outer wall surface, or the outer wall surfaces on which the electrode terminals 13 are arranged are divided for each of the electrode terminal 13, in the battery cells 11. In the battery module 10, the respective battery cells 11 are arranged in series in a state where the electrode terminals 13 of any one of battery cells 11 are aligned in a row and the other electrode terminals 13 are also aligned in a row. Thus, an electrode terminal group 14 formed of the electrode terminals 13 aligned in a row is provided at two points in the battery module 10 (FIGS. 1 and 2). As the battery module 10, for example, the electrode terminals 13 having the positive polarity and the negative polarity may be alternately arranged or the electrode terminals 13 having the same polarity may be arranged side by side in the respective electrode terminal groups 14.

In the battery module 10, the two electrode terminals 13 adjacent to each other in the arrangement direction of the battery cells 11 are linked to each of the electrode terminal groups 14 via a conductive bus bar 15 (FIGS. 1 and 2). The bus bar 15 is molded using a conductive material such as metal and is provided for each combination of the two adjacent electrode terminals 13. Thus, each of the bus bars 15 physically and electrically connects the two electrode terminals 13 for each combination of the electrode terminals. The bus bar 15 is molded using the conductive material such as metal. The bus bar body 15a is formed in a rectangular flat plate shape in the bus bar 15 in this example (FIGS. 3 and 5 to 9). For example, when the electrode terminal 13 has the plate shape, the bus bar 15 is physically and electrically connected to the electrode terminal 13 by welding (laser welding or the like). On the other hand, when the electrode terminal 13 is the electrode post, a through hole through which each of the electrode terminal 13 is inserted is formed in a bus bar body 15a, and the electrode terminals 13 are physically and electrically connected to each other by fixing the bus bar 15 to the electrode terminals 13 by screwing or the like. Further, the two electrode terminals 13 which are not linked to each other via the bus bar 15 are present in the battery module 10, one of which serves as a so-called total positive electrode and the other of which serves as a so-called total negative electrode.

For example, the cell body 12 forms a rectangular parallelepiped in the battery cell 11 according to the present embodiment. Thus, the battery module 10 according to the present embodiment virtually forms a rectangular parallelepiped by the respective battery cells 11, and has six wall surfaces of an aggregate formed of the plurality of battery cells 11 along the arrangement direction of the plurality of battery cells 11. In addition, the battery cells 11 according to the present embodiment is provided such that the respective electrode terminals 13 are provided as the electrode posts on an outer wall surface (first outer wall surface 12a) of the cell body 12 (FIG. 4). Here, stud bolts are each vertically provided on both end portion sides of the first outer wall surface 12a in a longitudinal direction, and the stud bolts are each used as the electrode terminals 13. Thus, the battery module 10 according to the present embodiment is provided with the two electrode terminal groups 14 on one of the six wall faces forming the rectangular parallelepiped. Hereinafter, a plane along the wall surface on which the two electrode terminal groups 14 are provided will be defined as a reference plane. The reference plane is a plane orthogonal to an extending direction of the respective electrode terminals 13, and thus, is also a plane orthogonal to a mounting direction at the time of mounting the conductive module 30 to the battery module 10. For example, the battery module 10 is placed such that the wall surface on which the electrode terminal group 14 is provided faces an upper side of the vehicle.

In this battery module 10, the bus bar 15 is prepared for each combination of the two adjacent electrode terminals 13. The bus bar 15 is physically and electrically connected to each of the electrode terminals 13 by inserting each of the stud bolts as the two electrode terminals 13 into two through holes 15b (FIGS. 3, 5, 6, and 9) of the bus bar body 15a, and fastening a female screw member 16 (FIGS. 1 to 3) to a male screw portion of the electrode terminal 13. Incidentally, the battery module 10 in the drawing is obtained by extracting a part of the plurality of arranged battery cells 11 extracted. Thus, when only one of the combinations of two adjacent electrode terminals 13 is illustrated, the illustration of the bus bar 15 mounted to the electrode terminal 13 is omitted herein.

In the battery module 10, a state as the aggregate is maintained by the holding structural body 20 for each of the battery cells 11. The holding structural body 20 includes a plurality of insulating members 20A that individually sandwich the battery cells 11 in the arrangement direction of the plurality of battery cells 11 (FIGS. 1 and 4). The insulating member 20A holds the battery cell 11 and also achieves electrically insulation of the battery cell 11. The insulating member 20A mainly insulates the adjacent battery cells 11 from each other, and is referred to as a so-called separator. Each of the battery cells 11 is held in the state of being sandwiched between two insulating members 20A. Here, the battery cell 11 and the insulating member 20A are alternately arranged along the arrangement direction of the battery cells 11.

The insulating member 20A is molded using an insulating material such as synthetic resin. For example, the insulating member 20A includes a main plate 21 which has a substantially rectangular flat plate shape and covers a main wall surface of the battery cell 11 (a wall surface having a main size such as wall surfaces of the adjacent battery cells 11 opposing each other) (FIG. 4). The main plate 21 is sandwiched between the two adjacent battery cells 11.

Further, the insulating member 20A in this example is molded so as to be capable of holding the two battery cells 11 sandwiching the main plate 21 of the insulating member 20A when the battery cell 11 and the insulating member 20A are alternately stacked. For example, the battery cell 11 is held by the insulating member 20A by locking four outer wall surfaces (first to fourth outer wall surfaces 12a to 12d) other than two outer wall surfaces opposing the main plate 21 among the six outer wall surfaces of the cell body 12. The insulating member 20A is provided with a first locking body 22 capable of locking the first outer wall surface 12a of the cell body 12, a second locking body 23 capable of locking the second outer wall surface 12b of the cell body 12, a third locking body 24 capable of locking the third outer wall surface 12c of the cell body 12, and a fourth locking body 25 capable of locking the fourth outer wall surface 12d of the cell body 12 (FIG. 4). Relative movement of the battery cell 11 in a crossing direction with respect to the arrangement direction of the battery cells 11 is locked by the first to fourth locking bodies 22 to 25 thereof.

To be specific, an insulating member (insulating member 20A1), which includes a battery-side engagement body 72 to be described later, and an insulating member (insulating member 20A2), which does not include the battery-side engagement body 72, are prepared as the insulating member 20A in this example (FIGS. 1 to 4). Further, the insulating member 20A1 and the insulating member 20A2 are arranged alternately along the arrangement direction of the battery cells 11 in the holding structural body 20.

In the holding structural body 20, the respective battery cells 11 are bundled by the plurality of insulating members 20A, and the respective battery cells 11 are held by a restraining member (not illustrated), which serves as a holding member, from the outside in order to maintain such a state. For example, the restraining member is molded into a U-shaped body to sandwich the insulating members 20A at both ends in the arrangement direction of the respective battery cells 11, and is arranged in two points. The restraining member is molded using a metal material or the like, and the aggregate of the battery cell 11 and the insulating member 20A is press-fitted into the U-shaped body.

Figure 9:
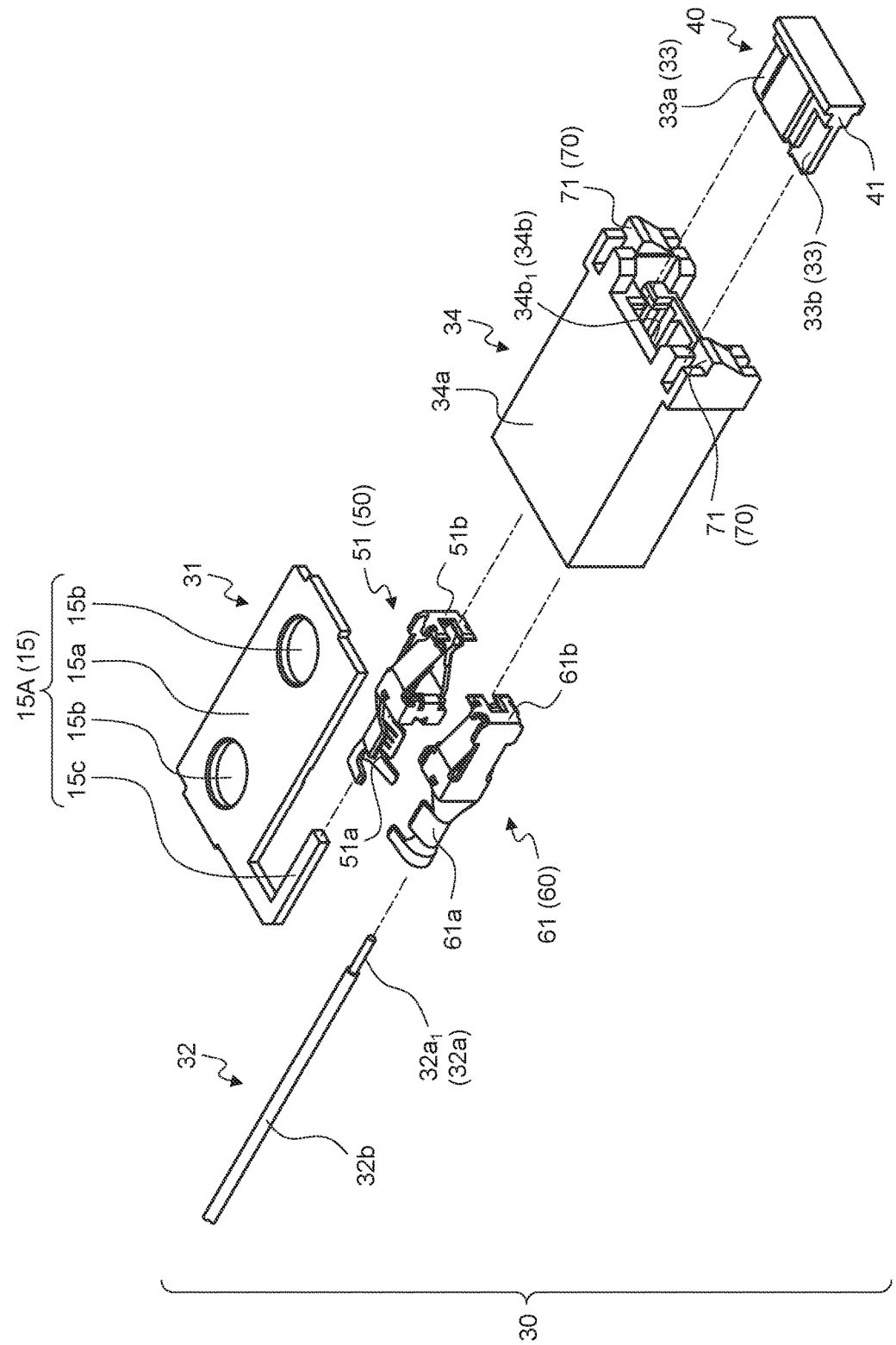
FIG. 9 is an exploded perspective view of the conductive module.

The conductive module 30 electrically connects the battery cell 11 and the arithmetic processing device 201 (FIG. 2) of the battery monitoring unit 200. In the battery pack 1, the plurality of conductive modules 30 are arranged along the arrangement direction of the respective battery cells 11 with respect to the battery module 10 (the aggregate configured of the plurality of battery cells 11). The respective conductive modules 30 are arranged side by side in at least one of the two electrode terminal groups 14, for example. In this example, the plurality of conductive modules 30 are arranged in one of the electrode terminal groups 14. The conductive module 30 is provided with a first conductive member 31, a second conductive member 32, a circuit protection member 33 (or a circuit protection part 40), and a housing member 34 (FIGS. 5 to 9). In this conductive module 30, the circuit protection member 33 is interposed between the first conductive member 31 and the second conductive member 32, and these three members are electrically connected to each other. Further, the conductive module 30 is provided with a first electrical connection structural body 50 and a second electrical connection structural body 60 (FIG. 9). The conductive module 30 includes the first conductive member 31, the second conductive member 32, the circuit protection member 33 (or the circuit protection part 40), the housing member 34, the first electrical connection structural body 50, and the second electrical connection structural body 60 as one module. Hereinafter, each configuration of the conductive module 30 will be described.

The first conductive member 31 is a conductive member that is electrically connected to one of the two electrode terminals 13 included in the battery cell 11 being a connection target, the connection target being at least one of the respective battery cells 11. The first conductive member 31 is electrically connected by being directly or indirectly mounted to the electrode terminal 13. For example, it is possible to use the bus bar 15 described above as the first conductive member 31 directly mounted to the electrode terminal 13. In this case, the first conductive member 31 is physically and electrically connected to the two electrode terminals 13 adjacent in the arrangement direction of the battery cells 11 as described above. Meanwhile, the first conductive member 31 may be a conductor that is physically and electrically connected to the bus bar 15. In this case, the conductor is indirectly and electrically connected to the two electrode terminals 13 adjacent in the arrangement direction of the battery cells 11 via the bus bar 15. The first conductive member 31 and the bus bar 15 are connected to each other using, for example, a fitting structure, welding, screwing, or the like. In addition, the first conductive member 31 may be a conductor that is physically and electrically connected to one of the electrode terminals 13. In this case, the conductor is molded in a flat plate-shape having one through hole and is directly mounted to the electrode terminal 13 by inserting and screwing the electrode terminal 13 into the through hole. In addition, the first conductive member 31 may be a conductor that is physically and electrically connected to an equipotential portion (for example, a conductive member or the like connected to the electrode terminal 13) having the same potential as the electrode terminal 13. In this case, the conductor is indirectly and electrically connected to the one electrode terminal 13 via the equipotential portion. The first conductive member 31 and the equipotential portion are connected to each other using, for example, a fitting structure, welding, screwing, or the like.

Figure 6:
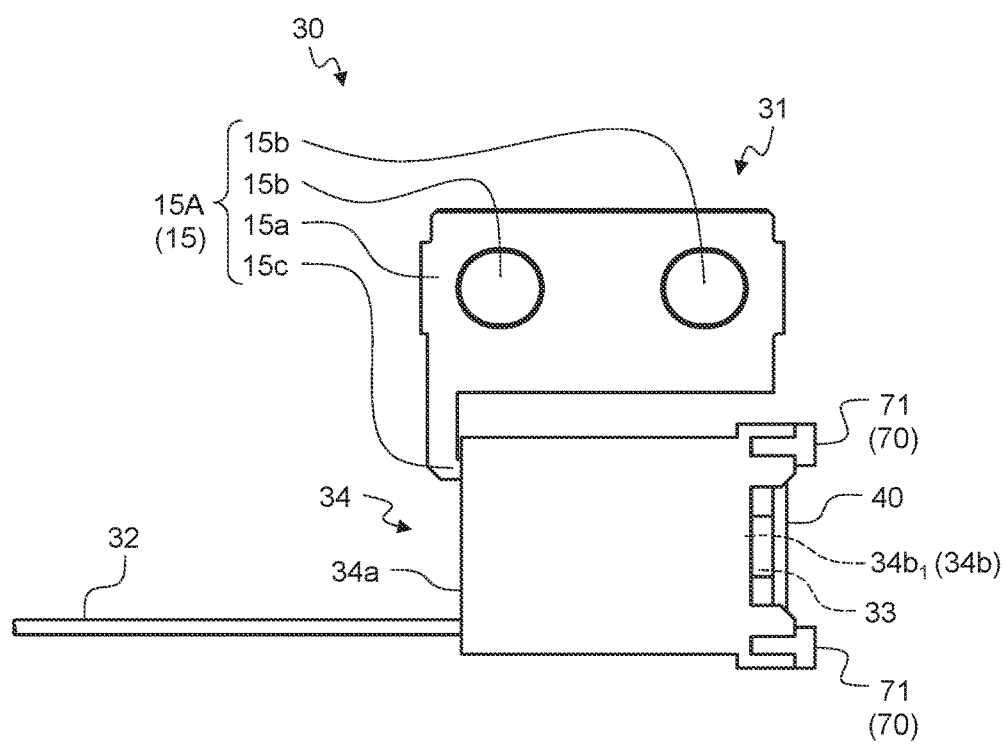
FIG. 6 is a plan view illustrating the conductive module according to the embodiment.
Figure 7:
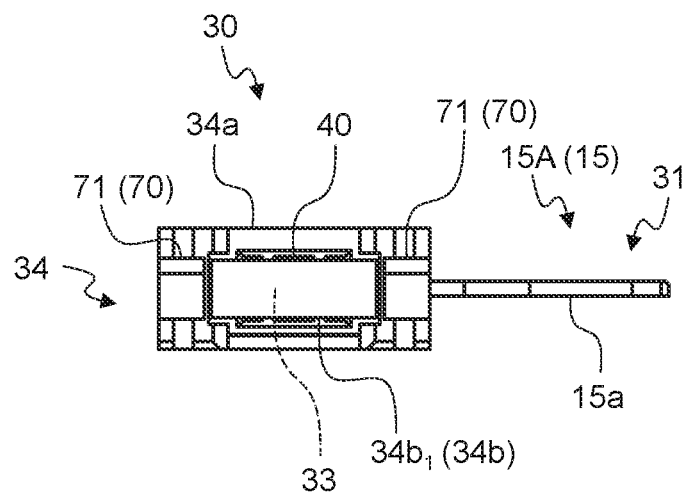
FIG. 7 is a side view of the conductive module according to the embodiment as viewed from a circuit protection part side.
Figure 8:
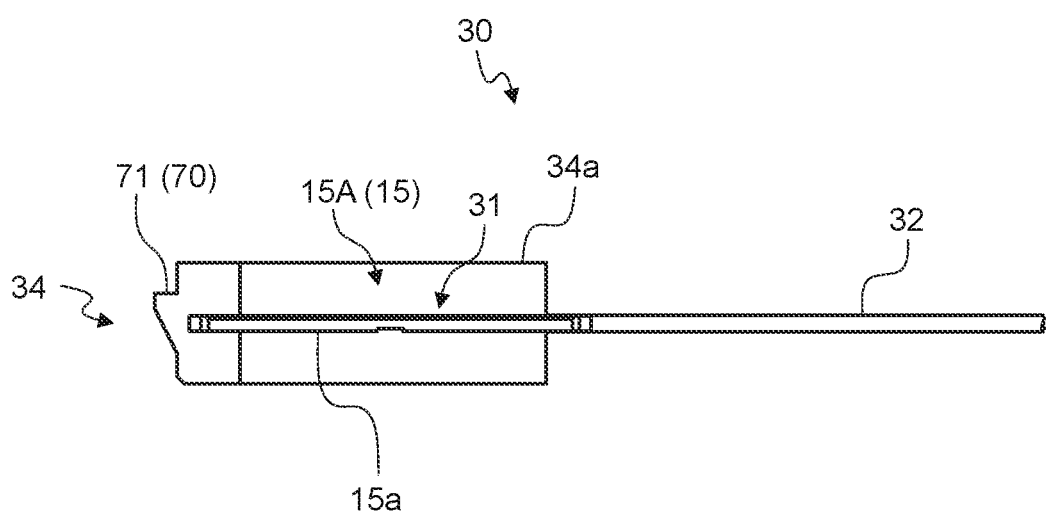
FIG. 8 is a side view of the conductive module according to the embodiment viewed from a first conductive member side.

In this example, the bus bar 15 is used as the first conductive member 31. Thus, a bus bar that is used as one of the configuration of the conductive module 30 among the bus bars 15 is referred to as a bus bar 15A. The bus bar 15A has an electrical connection portion 15c configured to be electrically connected to the circuit protection member 33 side in order for use as the first conductive member 31 (FIGS. 6 and 9). The electrical connection portion 15c will be described later in detail.

The second conductive member 32 includes a conductor that electrically connects the processing device 201 of the battery monitoring unit 200 to the first conductive member 31. The first conductive member 31 and the arithmetic processing device 201 are electrically connected to each other via the second conductive member 32 and the circuit protection member 33. When the conductive module 30 is mounted to the battery module 10, the second conductive member 32 extends in the arrangement direction of the respective battery cells 11. For example, the second conductive member 32 includes a conductive portion 32a as the conductor extending in the arrangement direction of the respective battery cells 11 after being mounted to the battery module 10 (FIG. 9). The conductive portion 32a has an electrical connection portion $32a_1$ configured to be electrically connected to the circuit protection member 33 side. Further, the second conductive member 32 is provided with an insulating portion 32b which has an electrical insulating property and covers the conductive portion 32a. The insulating portion 32b covers a part of the conductive portion 32a excluding at least the electrical connection portion $32a_1$. An electric wire, obtained by covering a core wire serving as the conductive portion 32a with coating serving as the insulating portion 32b, is used as the second conductive member 32 in this example. In the second conductive member 32, a core wire part that has been exposed as the coating at a terminal thereof is peeled off is used as the electrical connection portion $32a_1$.

The circuit protection member 33 is configured to protect a circuit by connecting the first conductive member 31 and the second conductive member 32 in series. The circuit protection member 33 is a conductive member that includes a first electrical connection portion 33a, which is electrically connected to the electrical connection portion 15c of the first conductive member 31, a second electrical connection portion 33b, which is electrically connected to the electrical connection portion $32a_1$ of the second conductive member 32, and a fuse element (not illustrated) arranged between the first electrical connection portion 33a and the second electrical connection portion 33b (FIG. 9). The circuit protection member 33 is molded using a conductive material such as metal.

The circuit protection member 33 in this example is provided as the circuit protection part 40 in which the fuse element is enclosed in an insulating enclosing member 41 in a state where each of the first electrical connection portion 33a and the second electrical connection portion 33b is exposed (FIG. 9). For example, the circuit protection member 33 is molded in a plate fuse shape in which the first electrical connection portion 33a, the second electrical connection portion 33b, and the fuse element are arranged on the same plane. The first electrical connection portion 33a and the second electrical connection portion 33b are formed in a so-called male tab shape in the plate fuse-shaped circuit protection member 33. The enclosing member 41 is molded using an insulating material such as synthetic resin. The enclosing member 41 is molded in a substantially rectangular parallelepiped shape. For example, the circuit protection part 40 may be a fuse unit formed by individually molding the circuit protection member 33 and the enclosing member 41 and assembling these members with each other, or may be a fuse unit by integrally molding the enclosing member 41 with the circuit protection member 33 arranged in a mold. In addition, the circuit protection part 40 may be a so-called axial lead fuse. The circuit protection member 33 in this example is configured as a fuse unit including the plate fuse-shaped circuit protection member 33, and the first electrical connection portion 33a and the second electrical connection portion 33b are configured to protrude in the same direction.

The conductive module 30 is provided with the first electrical connection structural body 50 that electrically connects the first conductive member 31 and the circuit protection member 33. The first electrical connection structural body 50 is configured to electrically connect the electrical connection portion 15c of the first conductive member 31 and the first electrical connection portion 33a of the circuit protection member 33, and electrically connects the first conductive member 31 and the circuit protection member 33 by directly or indirectly connecting the electrical connection portion 15c and the first electrical connection portion 33a. For example, it is possible to electrically connect the electrical connection portion 15c and the first electrical connection portion 33a to each other by directly linking both the portions to each other by welding, soldering, or the like. In this case, this linking part serves as the first electrical connection structural body 50. In addition, it is possible to electrically connect the electrical connection portion 15c and the first electrical connection portion 33a to each other by indirectly linking both the portions to each other via a connection terminal (hereinafter, referred to as a "first connection terminal") 51. In this case, the first connection terminal 51 is included in the first electrical connection structural body 50. The latter is applied in this example (FIG. 9).

The first connection terminal 51 is molded using a conductive material such as metal. For example, the first connection terminal 51 in this example includes an electrical connection portion (hereinafter, referred to as a "first linking portion") 51a, which is physically and electrically connected to the electrical connection portion 15c of the first conductive member 31, and an electrical connection portion (hereinafter, referred to as a "second linking portion") 51b which is physically and electrically connected the first electrical connection portion 33a of the circuit protection member 33.

The first linking portion 51a will be described. The electrical connection portion 15c is configured to protrude from the bus bar body 15a in the first conductive member 31 (bus bar 15A) in this example. The electrical connection portion 15c is a shaft-shaped portion extending in the arrangement direction of the battery cells 11 on the same plane as the bus bar body 15a, and is arranged at a position offset from one side portion (here, a long side) of the bus bar body 15a. The first linking portion 51a is physically and electrically connected to the electrical connection portion 15c having such a shape and arrangement. For example, the first linking portion 51a has at least one set of barrel pieces facing each other, and is physically and electrically connected to the electrical connection portion 15c by being tightened to enclose the electrical connection portion 15c from the outside using the respective barrel pieces and being crimped to the electrical connection portion 15c.

Subsequently, the second linking portion 51b will be described. In the circuit protection member 33 in this example, the first electrical connection portion 33a is formed in the male tab shape as described above. The second linking portion 51b is physically and electrically connected to the first electrical connection portion 33a formed as such a male terminal. The second linking portion 51b in this example is formed as a female terminal which allows insertion and removal of the first electrical connection portion 33a, and is physically and electrically connected to the first electrical connection portion 33a inserting and fitting the first electrical connection portion 33a.

The first connection terminal 51 is formed such that the physical connection to the electrical connection portion 15c of the first conductive member 31 and the physical connection to the first electrical connection portion 33a of the circuit protection member 33 are performed on the plane parallel to the above-described reference plane (for example, on the same plane as the bus bar body 15a). The first linking portion 51a and the second linking portion 51b are arranged in the first connection terminal 51 in this example such that an insertion and removal direction of the first electrical connection portion 33a with respect to the second linking portion 51b is set along an axial direction of the electrical connection portion 15c.

In addition, the conductive module 30 is provided with the second electrical connection structural body 60 that electrically connects the second conductive member 32 and the circuit protection member 33. The second electrical connection structural body 60 is configured to electrically connect the electrical connection portion $32a_1$ of the second conductive member 32 and the second electrical connection portion 33b of the circuit protection member 33, and electrically connects the second conductive member 32 and the circuit protection member 33 by directly or indirectly connecting the electrical connection portion $32a_1$ and the second electrical connection portion 33b. For example, it is possible to electrically connect the electrical connection portion $32a_1$ and the second electrical connection portion 33b to each other by directly linking both the portions to each other by welding, soldering, or the like. In this case, this linking part serves as the second electrical connection structural body 60. In addition, it is possible to electrically connect the electrical connection portion $32a_1$ and the second electrical connection portion 33b to each other by indirectly linking both the portions to each other via a connection terminal (hereinafter, referred to as a "second connection terminal") 61. In this case, the second connection terminal 61 is included in the second electrical connection structural body 60. The latter is applied in this example (FIG. 9).

The second connection terminal 61 is molded using a conductive material such as metal. For example, the second connection terminal 61 in this example includes an electrical connection portion (hereinafter, referred to as a "first linking portion") 61a, which is physically and electrically connected to the electrical connection portion $32a_1$ of the second conductive member 32, and an electrical connection portion (hereinafter, referred to as a "second linking portion") 61b which is physically and electrically connected the second electrical connection portion 33b of the circuit protection member 33.

The first linking portion 61a will be described. The exposed core wire part at the terminal of the second conductive member 32 (electric wire) in this example serves as the electrical connection portion $32a_1$ as described above. The first linking portion 61a is physically and electrically connected to the electrical connection portion $32a_1$. For example, the first linking portion 61a has at least one set of barrel pieces facing each other, and is physically and electrically connected to the electrical connection portion $32a_1$ at the terminal thereof by being tightened to enclose the terminal of the second conductive member 32 from the outside using the respective barrel pieces and being crimped to the terminal.

Subsequently, the second linking portion 61b will be described. In the circuit protection member 33 in this example, the second electrical connection portion 33b is also formed in the male tab shape as described above. The second linking portion 61b is physically and electrically connected to the second electrical connection portion 33b formed as such a male terminal. The second linking portion 61b in this example is formed as a female terminal which allows insertion and removal of the second electrical connection portion 33b, and is physically and electrically connected to the second electrical connection portion 33b by inserting and fitting the second electrical connection portion 33b.

The second connection terminal 61 is formed such that the physical connection to the electrical connection portion $32a_1$ of the second conductive member 32 and the physical connection to the second electrical connection portion 33b of the circuit protection member 33 are performed on a plane parallel to the above-described reference plane (for example, on the same plane as the bus bar body 15a), which is similar to the first connection terminal 51. The first linking portion 61a and the second linking portion 61b are arranged in the second connection terminal 61 in this example such that an insertion and removal direction of the second electrical connection portion 33b with respect to the second linking portion 61b is set along an axial direction of the terminal of the second conductive member 32.

The first connection terminal 51 and the second connection terminal 61 are arranged on the same plane parallel to the reference plane in the first electrical connection structural body 50 and the second electrical connection structural body 60 in this example. That is, the first connection terminal 51 and the second connection terminal 61 are arranged side by side on the same plane along the reference plane when the conductive module 30 is mounted to the battery module 10, and arranged such that each longitudinal direction thereof is set along the arrangement direction of the battery cells 11.

The housing member 34 is a member that houses the circuit protection member 33, the first electrical connection structural body 50, and the second electrical connection structural body 60, and directly or indirectly holds these parts in the housing state. The housing member 34 is molded using an insulating material such as synthetic resin. In this example, a main body 34a of the housing member 34 is molded in a rectangular parallelepiped shape (FIGS. 5 to 11). The housing member 34 in this example is arranged such that two of six outer wall surfaces of the main body 34a are parallel to the reference plane and the other four outer wall surfaces intersect (here, are orthogonal to) the reference plane when the conductive module 30 is mounted to the battery module 10. Further, the housing member 34 is arranged such that two of the four outer wall surfaces, which intersect the reference plane, opposing each other are orthogonal to the arrangement direction of the battery cells 11 when the conductive module 30 is mounted to the battery module 10.

A housing chamber (hereinafter, referred to as a "protection body housing chamber") 34b that houses the circuit protection member 33 (FIG. 10), a housing chamber (hereinafter, referred to as a "first connection body housing chamber") 34c that houses the first electrical connection structural body 50 (FIG. 11), and a housing chamber (hereinafter, referred to as a "second connection body housing chamber") 34d that houses the second electrical connection structural body 60 (FIG. 11) are formed in the housing member 34.

In the housing member 34 according to the present embodiment, the protection body housing chamber 34b is formed such that a plane of the plate fuse-shaped circuit protection member 33 is parallel to the reference plane when the conductive module 30 is mounted to the battery module 10. For example, the protection body housing chamber 34b in this example is formed to directly house and hold the circuit protection part 40, and is configured such that the plate fuse-shaped circuit protection member 33 is indirectly housed and held via the enclosing member 41. Thus, the protection body housing chamber 34b is formed in the housing member 34 such that the circuit protection part 40 is inserted along the reference plane.

To be specific, an opening $34b_1$ is provided in one of four outer wall surfaces of the main body 34a that intersects the reference plane when the conductive module 30 is mounted to the battery module 10 in the housing member 34 (FIGS. 5 to 7, 9 and 10), and the circuit protection part 40 is inserted from the opening $34b_1$ toward the protection body housing chamber 34b. The circuit protection part 40 is inserted from a side of the first and second electrical connection portions 33a and 33b of the circuit protection member 33. As described above, the first connection terminal 51 and the second connection terminal 61 are arranged such that the longitudinal directions thereof are set along the arrangement direction of the battery cells 11, and the circuit protection part 40 is inserted along the arrangement direction thereof, in the conductive module 30 in this example. Thus, the opening $34b_1$ is provided on one (an outer wall surface on the opposite side of a leading-out direction, which will be described later, of the second conductive member 32 as the electric wire) of the two outer wall surfaces of the main body 34a orthogonal to the arrangement direction.

Figure 11:
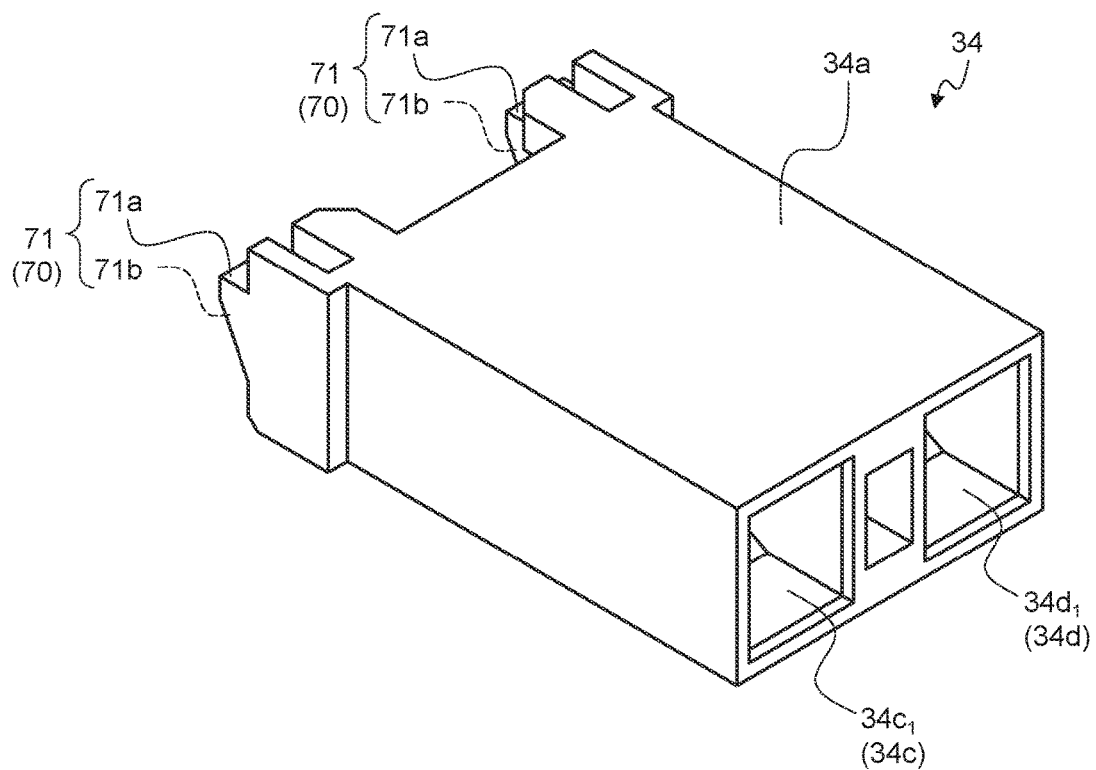
FIG. 11 is a perspective view of the housing member as viewed from another angle.

The first connection body housing chamber 34c and the second connection body housing chamber 34d are provided with openings $34c_1$ and $34d_1$, respectively, on the other of the two outer wall faces of the main body 34a orthogonal to the arrangement direction of the battery cells 11 (FIG. 11). Each of the first connection body housing chamber 34c and the second connection body housing chamber 34d communicates with the protection body housing chamber 34b, and is arranged side by side on the same plane along the reference plane together with the protection body housing chamber 34b. Thus, when the circuit protection part 40 is housed in the protection body housing chamber 34b, the first electrical connection portion 33a and the second electrical connection portion 33b of the circuit protection member 33 are inserted into the first connection body housing chamber 34c and the second connection body housing chamber 34d, respectively.

In the housing member 34 in this example, the first connection body housing chamber 34c and the second connection body housing chamber 34d are formed such that each of the first connection terminal 51 of the first electrical connection structural body 50 and the second connection terminal 61 of the second electrical connection structural body 60 is inserted in the same direction along the reference plane.

For example, the first linking portion 51a of the first connection terminal 51 is crimped onto the electrical connection portion 15c of the first conductive member 31, and the first linking portion 61a of the second connection terminal 61 is crimped onto the electrical connection portion $32a_1$ of the second conductive member 32, in advance, in the conductive module 30. Then, the first connection terminal 51 is inserted into the first connection body housing chamber 34c from the opening $34c_1$ together with the electrical connection portion 15c of the first conductive member 31. The first connection terminal 51 is inserted from the second linking portion 51b side. Then, the second connection terminal 61 is inserted into the second connection body housing chamber 34d from the opening $34d_1$ together with the electrical connection portion $32a_1$ of the second conductive member 32. The second connection terminal 61 is inserted from the second linking portion 61b side. Accordingly, the first electrical connection portion 33a of the circuit protection member 33 is fitted to the second linking portion 51b of the first connection terminal 51, and the second electrical connection portion 33b of the circuit protection member 33 is fitted to the second linking portion 61b of the second connection terminal 61 in the first connection body housing chamber 34c and the second connection body housing chamber 34d by housing the circuit protection part 40 in the protection body housing chamber 34b. In this manner, the first electrical connection structural body 50 in this example is configured such that the electrical connection portion 15c of the first conductive member 31 and the first electrical connection portion 33a of the circuit protection member 33 are electrically connected to each other by housing the circuit protection part 40 in the protection body housing chamber 34b of the housing member 34. In addition, the second electrical connection structural body 60 in this example is configured such that the electrical connection portion $32a_1$ of the second conductive member 32 and the second electrical connection portion 33b of the circuit protection member 33 are electrically connected to each other by housing the circuit protection part 40 in the protection body housing chamber 34b of the housing member 34.

Here, the electrical connection portion 15c of the first conductive member 31 slightly protrudes from the opening $34c_1$ along its own axial direction. Accordingly, the bus bar body 15a of the first conductive member 31 and the housing member 34 are arranged side by side along a direction orthogonal to an insertion direction of the first connection terminal 51 or an insertion and removal direction of the circuit protection part 40 with respect to the housing member 34 and along the reference plane. In addition, the second conductive member 32 as the electric wire is led out from the opening $34d_1$ in a direction (the insertion direction of the circuit protection part 40) opposite to the insertion direction of the second connection terminal 61 with respect to the housing member 34.

Meanwhile, the protection body housing chamber 34b can be formed to directly house and hold the circuit protection member 33. In addition, the first connection body housing chamber 34c and the second connection body housing chamber 34d can be formed to directly house and hold the first electrical connection structural body 50 and the second electrical connection structural body 60, respectively. Further, in this case, the housing member 34 can be formed to be integrally molded with the circuit protection member 33, the first electrical connection structural body 50, and the second electrical connection structural body 60. For example, in this case, it is possible to form the conductive module 30 having the same shape and arrangement as the above-described example by linking the first conductive member 31 and the circuit protection member 33 via the first electrical connection structural body 50, linking the second conductive member 32 and the circuit protection member 33 via the second electrical connection structural body 60, and integrally molding the housing member 34 by arranging the circuit protection member 33, the first electrical connection structural body 50 and the second electrical connection structural body 60 in a mold.

The conductive module 30 according to the present embodiment is provided with the first conductive member 31, the second conductive member 32, the circuit protection member 33 (the circuit protection part 40), the housing member 34, the first electrical connection structural body 50, and the second electrical connection structural body 60 which are arranged in the above-described manner. Thus, the first conductive member 31, the second conductive member 32, and the housing member 34 according to the present embodiment can be arranged to be side by side along the reference plane such that each transverse direction is orthogonal to the reference plane. More specifically, it is possible to arrange the conductive module 30 according to the present embodiment such that the circuit protection member 33 (the circuit protection part 40), the first electrical connection structural body 50, and the second electrical connection structural body 60 are housed in the housing member 34, and the housing member 34, the first conductive member 31, and at least a part of the second conductive member 32 as the electric wire, which is led out from the housing member 34, are arranged side by side along the reference plane such that each transverse direction is orthogonal to the reference plane. In other words, the conductive module 30 according to the present embodiment can be arranged such that all the circuit protection member 33 (the circuit protection part 40), the first electrical connection structural body 50, and the second electrical connection structural body 60, which are housed in the housing member 34, are arranged side by side along the reference plane such that the respective transverse directions are orthogonal to the reference plane by forming and arranging the first conductive member 31, the second conductive member 32, and the housing member 34 as described above. Therefore, the conductive module 30 can be reduced in height at the time of being mounted to the battery module 10, and achieve miniaturization of a size of the battery pack 1.

Here, the conductive module 30 according to the present embodiment is mounted to the battery module 10 via the first conductive member 31. Thus, the housing member 34 is arranged at a position away from such a mounting point in the conductive module 30. Thus, a mounting point for the battery module 10 is also provided in the housing member 34 in the conductive module 30 according to the present embodiment. For example, the battery cell 11 being the connection target of the conductive module 30 is sandwiched by the two insulating members 20A in the arrangement direction of the battery cells 11. Further, the housing member 34 is stacked together with the first conductive member 31 serving as the bus bar 15A on the two adjacent battery cells 11 being the connection target thereof in the conductive module 30 in this example. Accordingly, the conductive module 30 according to the present embodiment is provided with a mounting structure 70 which mounts the housing member 34 to the insulating member 20A being a mounting target, the mounting target being at least one of the insulating members 20A which sandwich the battery cell 11 being the connection target (FIGS. 1 to 3). In this example, one of the two insulating members 20A sandwiching the battery cell 11 is set as a mounting target of the housing member 34. Here, the insulating member 20A which is the mounting target to the housing member 34 is referred to as an insulating member 20A1, and the insulating member 20A which is not the mounting target of the housing member 34 is referred to as an insulating member 20A2.

Figure 12:
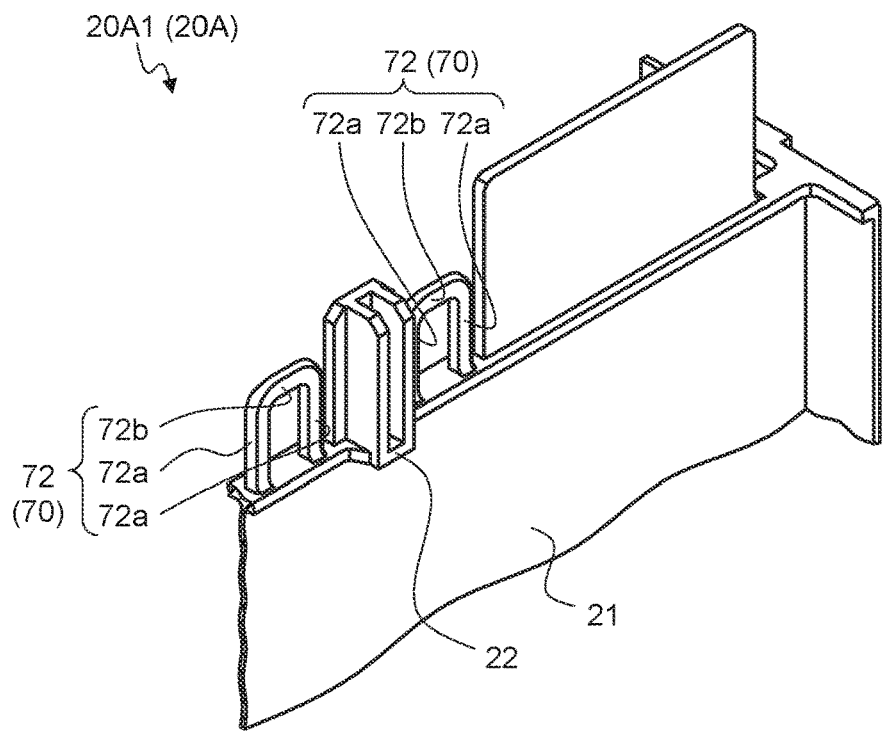
FIG. 12 is a perspective view of a battery-side locking body.
Figure 13:
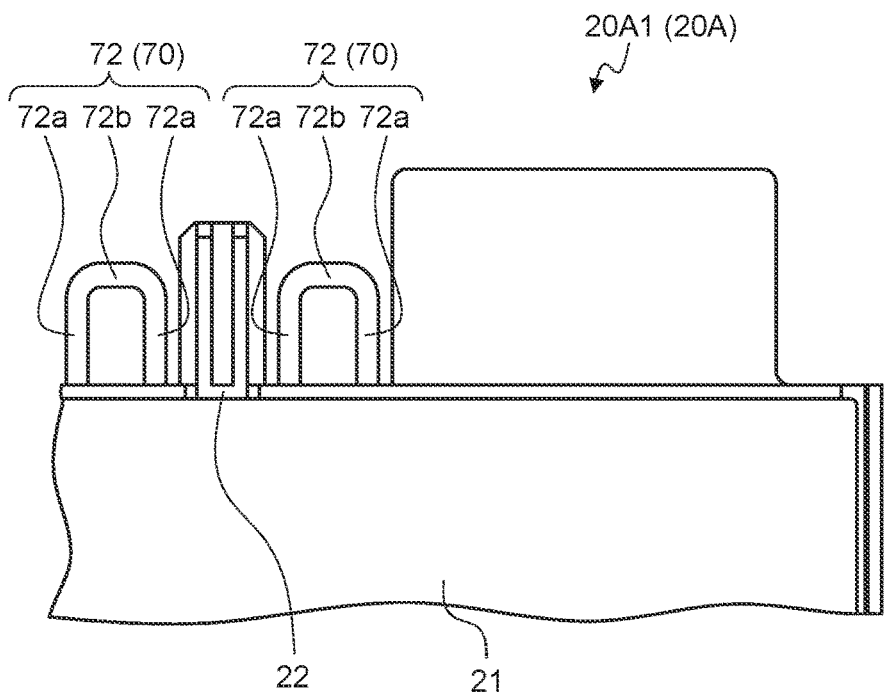
FIG. 13 is a plan view of the battery-side locking body.

The mounting structure 70 includes an engagement body (hereinafter, referred to as a "conductor-side engagement body") 71 provided in the housing member 34 (FIGS. 5 to 11) and an engagement body (hereinafter, referred to as a "battery-side engagement body") 72 provided in the insulating member 20A1 (FIGS. 4, 12 and 13). The mounting structure 70 fixes the housing member 34 and the insulating member 20A1 by engaging the conductor-side engagement body 71 and the battery-side engagement body 72 with each other. That is, the conductor-side engagement body 71 is configured to mount the housing member 34 to the insulating member 20A1 by being engaged with the battery-side engagement body 72 of the insulating member 20A1.

For example, one of the conductor-side engagement body 71 and the battery-side engagement body 72 is formed as a protruding body, and the other thereof is formed as a locking body that suppresses relative movement in a removal direction between the housing member 34 and the insulating member 20A1 by locking the protruding body. That is, the mounting structure 70 in this example is configured as a locking mechanism. Here, the conductor-side engagement body 71 is formed as the protruding body, and the battery-side engagement body 72 is formed as the locking body.

Figure 10:
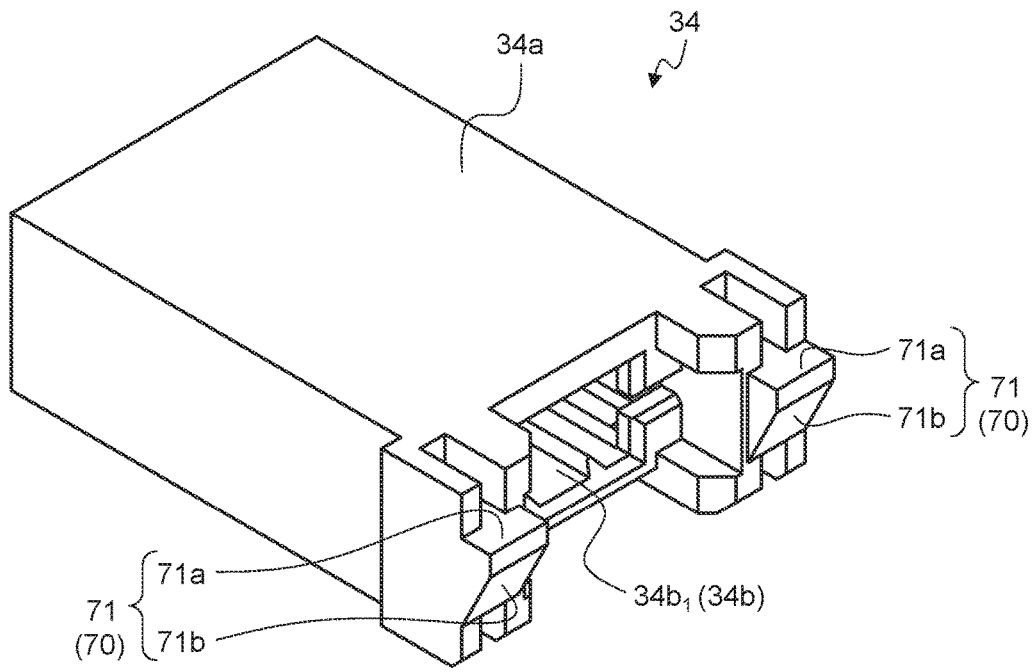
FIG. 10 is a perspective view of a housing member.

The conductor-side engagement body 71 in this example is the protruding body protruding from the outer wall surface of the main body 34a on the opening 34b$_1$ side toward the arrangement direction of the battery cells 11, and has a locked surface 71a on a side opposite to a mounting direction of the housing member 34 to the battery module 10 (FIGS. 10 and 11). Incidentally, the mounting direction of the housing member 34 is set along the direction orthogonal to the reference plane. On the other hand, the battery-side engagement body 72 is the locking body that protrudes from an end surface of one side portion (a side portion on which the first locking body 22 is arranged) of the main plate 21 of the insulating member 20A1 toward the direction orthogonal to the reference plane. The battery-side engagement body 72 in this example is formed in a U shape, and includes two leg portions 72a protruding from the side portion of the main plate 21 with an interval therebetween, and a linking portion 72b connecting end portions of the two leg portions 72a on a protruding direction side (FIGS. 12 and 13). The two leg portions 72a are made flexible, and the linking portion 72b is used as a locking portion of the locked surface 71a in the battery-side engagement body 72.

Figure 14:
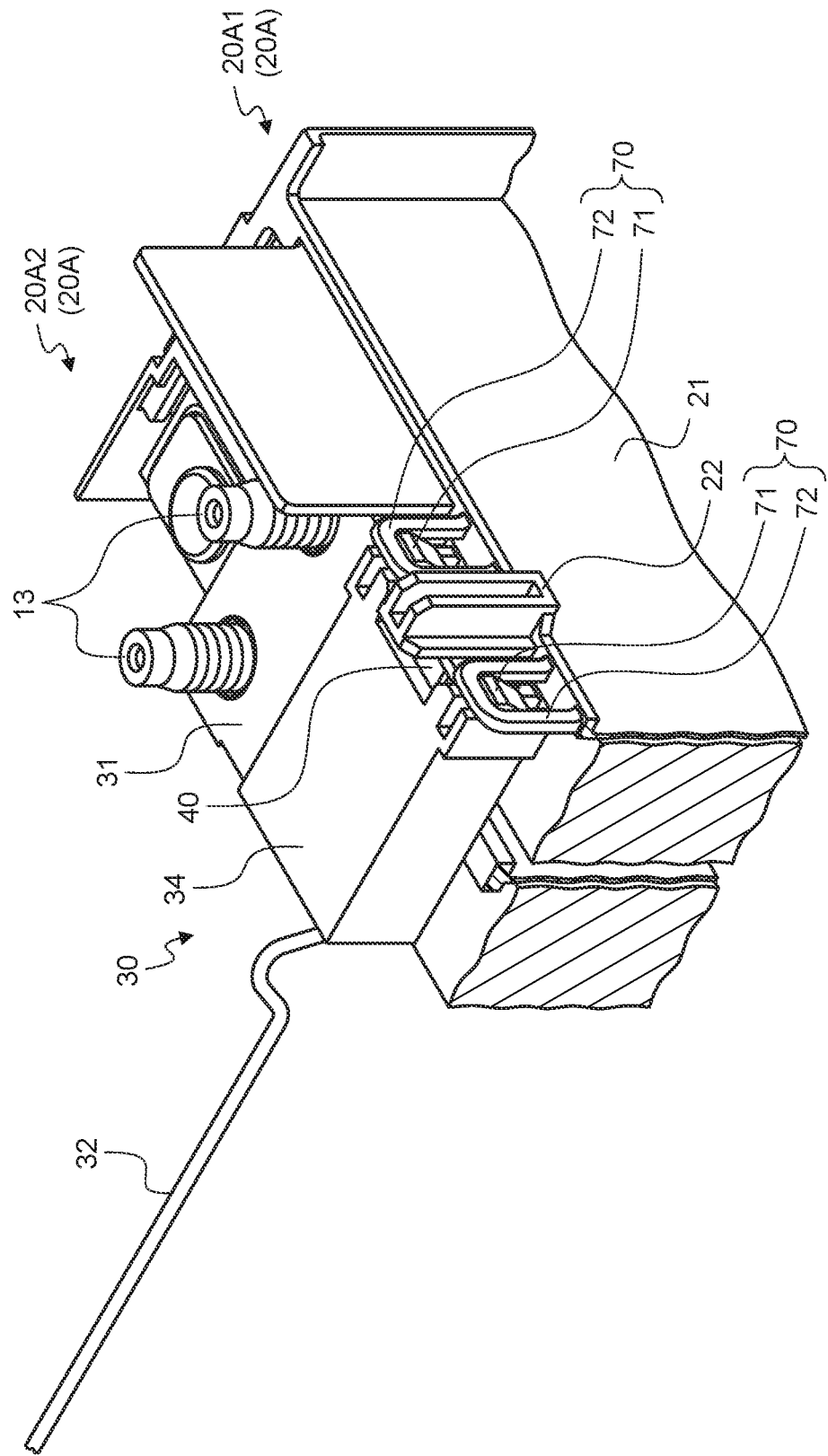
FIG. 14 is a perspective view illustrating an engagement state in a mounting structure.

In the mounting structure 70 in this example, the conductor-side engagement body 71 abuts on the linking portion 72b of the battery-side engagement body 72 as the mounting of the housing member 34 to the battery module 10 progresses, and the linking portion 72b of the battery-side engagement body 72 rides over the conductor-side engagement body 71 while the conductor-side engagement body 71 deflects the battery-side engagement body 72. Here, an inclined surface 71b is provided on the conductor-side engagement body 71 in order to facilitate such riding (FIGS. 10 and 11). The inclined surface 71b in this example is a flat surface that guides the linking portion 72b to the locked surface 71a while deflecting the battery-side engagement body 72, and is formed such that the deflection thereof gradually increases. Along with the riding of the linking portion 72b of the battery-side engagement body 72 in the mounting structure 70, the conductor-side engagement body 71 enters inside of the U-shape of the battery-side engagement body 72, and the conductor-side engagement body 71 and the linking portion 72b of the battery-side engagement body 72 face each other in the direction orthogonal to the reference plane (FIG. 14). Accordingly, the relative movement in the removal direction between the housing member 34 and the insulating member 20A1 is suppressed, and thus, apart of the housing member 34 in which the mounting structure 70 is installed serves as the mounting point with respect to the battery module 10.

In this manner, the conductive module 30 according to the present embodiment can be mounted to the battery module 10 at two points, that is, the first conductive member 31 and the housing member 34. Thus, the conductive module 30 can complete the mounting to the battery module 10 while securing strength against external input, for example, without intervention of a case which an additional member as that in the related art. Accordingly, the conductive module 30 can achieve the miniaturization of the size of the battery pack 1. In particular, the conductive module 30 in this example achieves the reduction in height as described above, and thus, it is possible to further miniaturize the size of the battery pack 1.

As described above, the conductive module 30 according to the present embodiment contributes to the miniaturization of the size of the battery pack 1. Accordingly, it is possible to miniaturize the size the battery pack 1 by applying the conductive module 30 according to the present embodiment.

Meanwhile, the battery cell 11 thermally shrinks and changes its own size due to heat generation accompanying the use thereof. Thus, the mounting structure 70 is provided such that the housing member 34 is mounted to one (the insulating member 20A1) of the insulating members 20A that sandwich the battery cell 11 in the conductive module 30 described in the above specific example. That is, when the battery cell 11 thermally shrinks, it is possible to move the housing member 34 in accordance with the change in size of the battery cell 11 in the conductive module 30. Accordingly, it is possible to constantly maintain the engagement state between the conductor-side engagement body 71 and the battery-side engagement body 72 even when the battery cell 11 thermally shrinks, and further, it is possible to mitigate input of an excessive load between the conductor-side engagement body 71 and the battery-side engagement body 72, in the mounting structure 70 of the conductive module 30. Accordingly, the conductive module 30 can suppress deterioration of the function thereof and can improve the durability of the conductive module 30 itself and the battery module 10.

Modified Example

In this modified example, the conductive module 30 according to the embodiment described above is replaced with a conductive module 130 to be described hereinafter.

In the conductive module 30 according to the embodiment, the first conductive member 31 and the housing member 34 are linked via the first connection terminal 51 housed and held in the housing member 34. That is, the first conductive member 31 and the housing member 34 are connected only using a linking structure at one point via the first connection terminal 51 in the conductive module 30 according to the embodiment. Thus, the conductive module 130 according to the present modified example disperses a load applied along with external input and improves the durability by providing a linking structure at a plurality of points. The conductive module 130 according to the present modified example replaces the first conductive member 31 and the housing member 34 in the conductive module 30 according to the embodiment with a first conductive member 131 and a housing member 134 to be described hereinafter, and is provided with a linking structure 180, which links the first conductive member 131 and the housing member 134 (FIGS. 15 to 21).

The first conductive member 131 is a bus bar 15B that physically and electrically connects two adjacent electrode terminals 13, which is similar to the first conductive member 31 according to the embodiment. The first conductive member 131 includes a bus bar body 15a formed in the same shape and arrangement as the first conductive member 31 according to the embodiment, two through holes 15b, and an electrical connection portion 15c.

Figure 19:
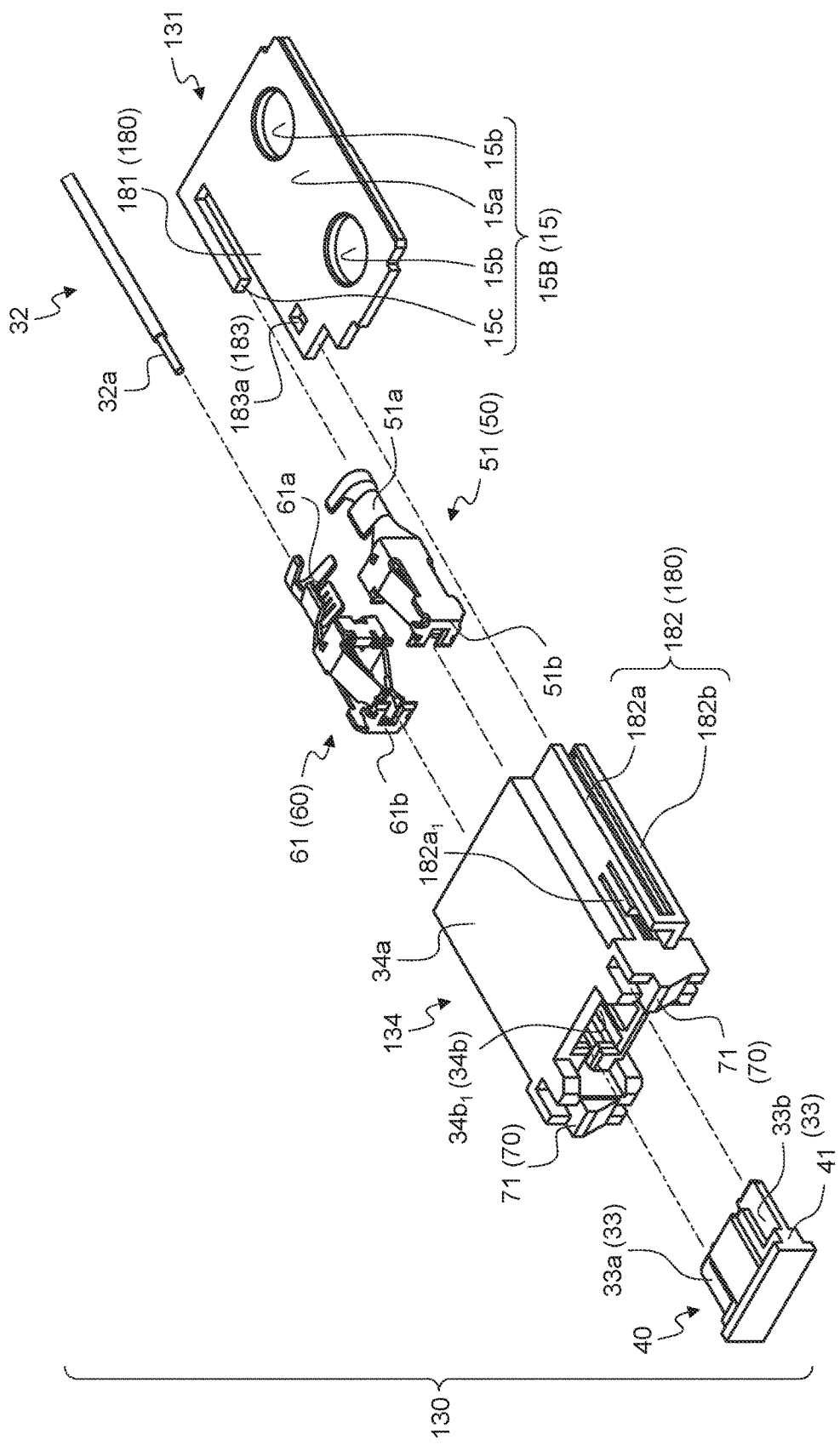
FIG. 19 is an exploded perspective view of the conductive module according to the modified example.

The housing member 134 includes a main body 34a formed in the same shape as the housing member 34 according to the embodiment, and a protection body housing chamber 34b, a first connection body housing chamber 34c (not illustrated), a second connection body housing chamber 34d (not illustrated), and a conductor-side engagement body 71 are formed in the same shapes and arrangement as those of the housing member 34 according to the embodiment, in the main body 34a. Thus, a circuit protection part 40, a first connection terminal 51, and a second connection terminal 61 are housed and held in the housing member 134 (FIG. 19). Accordingly, the first conductive member 131 and the housing member 134 are indirectly linked using a linking structure at one point via the first connection terminal 51 in the conductive module 130 according to the present modified example, which is similar to the conductive module 30 according to the embodiment.

The conductive module 130 according to the present modified example is provided with a linking structure 180 additionally to the linking structure. The linking structure 180 directly links the first conductive member 131 and the housing member 134, and is provided between the first conductive member 131 and the housing member 134. The linking structure 180 includes a first linking engagement body 181 provided in the first conductive member 131 and a second linking engagement body 182 provided in the housing member 134 (FIGS. 15 to 21). The linking structure 180 in this example links the first conductive member 131 and the housing member 134 by nipping a side portion on the electrical connection portion 15c side of the bus bar body 15a on the housing member 134 side. In the first conductive member 131, the side portion of the bus bar body 15a is used as the first linking engagement body 181 (FIG. 19). On the other hand, the second linking engagement body 182 is provided in the main body 34a in the housing member 134.

To be specific, when the electrical connection portion 15c of the first conductive member 131 is inserted into the first connection body housing chamber 34c together with the first connection terminal 51, the linking structure 180 causes the side portion of the bus bar body 15a serving as the first linking engagement body 181 to be nipped by the second linking engagement body 182. For this purpose, the second linking engagement body 182 protrudes from an outer wall surface of the main body 34a on a side where the bus bar body 15a is arranged toward the bus bar body 15a. The second linking engagement body 182 in this example includes first and second pieces 182a and 182b which are arranged with an interval therebetween in a direction orthogonal to a reference plane (FIGS. 17 to 21).

Each of the first piece 182a and the second piece 182b has a flat surface along the reference plane, and protrudes from the outer wall surface of the main body 34a on the side where the bus bar body 15a is arranged toward the bus bar body 15a. The first piece 182a and the second piece 182b allows the side portion (the first linking engagement body 181) of the bus bar body 15a, mounted to the housing member 134, to be inserted therebetween, and protrude up to positions that enables such insertion. In addition, the first piece 182a and the second piece 182b are configured such that the interval therebetween in the direction orthogonal to the reference plane is larger than a plate thickness of the bus bar body 15a so as the enable such insertion. As a result, the side portion (the first linking engagement body 181) of the bus bar body 15a is inserted into the first connection body housing chamber 34c of the electrical connection portion 15c and inserted between the first piece 182a and the second piece 182b. The first piece 182a and the second piece 182b in this example are configured to extend along a mounting direction of the first conductive member 131 with respect to the housing member 134 so as to cover substantially the entire side portion (the first linking engagement body 181) of the bus bar body 15a.

Figure 20:
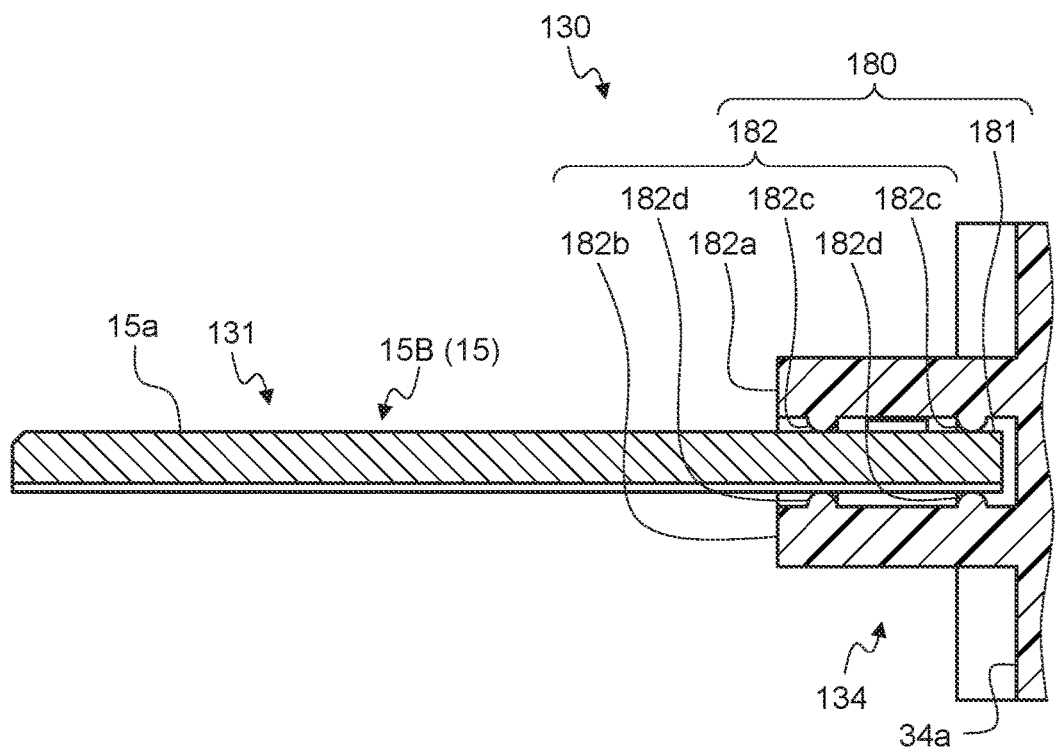
FIG. 20 is a cross-sectional view taken along line X-X of FIG. 16.

The first piece 182a and the second piece 182b are provided, respectively, with nipping portions 182c and 182d that protrude towards the side portion (the first linking engagement body 181) of the inserted bus bar body 15a so as to nip the side portion (FIG. 20). Each of the nipping portions 182c and 182d protrudes so as to face each other in the direction orthogonal to the reference plane and is formed such that the interval therebetween in the orthogonal direction has a dimension equal to the plate thickness of the bus bar body 15a. For example, the nipping portions 182c and 182d are protruding bodies extending along the mounting direction of the first conductive member 131 with respect to the housing member 134, and are formed such that a cross section orthogonal to the extending direction is an arc-shaped cross section with a vertex on a protruding direction side. As the side portion (the first linking engagement body 181) of the bus bar body 15a is inserted between the first piece 182a and the second piece 182b, the respective nipping portions 182c and 182d gradually nip the side portion.

At least one set of combinations of the nipping portions 182c and 182d may be provided in the linking structure 180. Here, two sets are provided with an interval therebetween in a direction along the reference plane, in a direction orthogonal to an insertion direction of the side portion (the first linking engagement body 181) of the bus bar body 15a.

Figure 16:
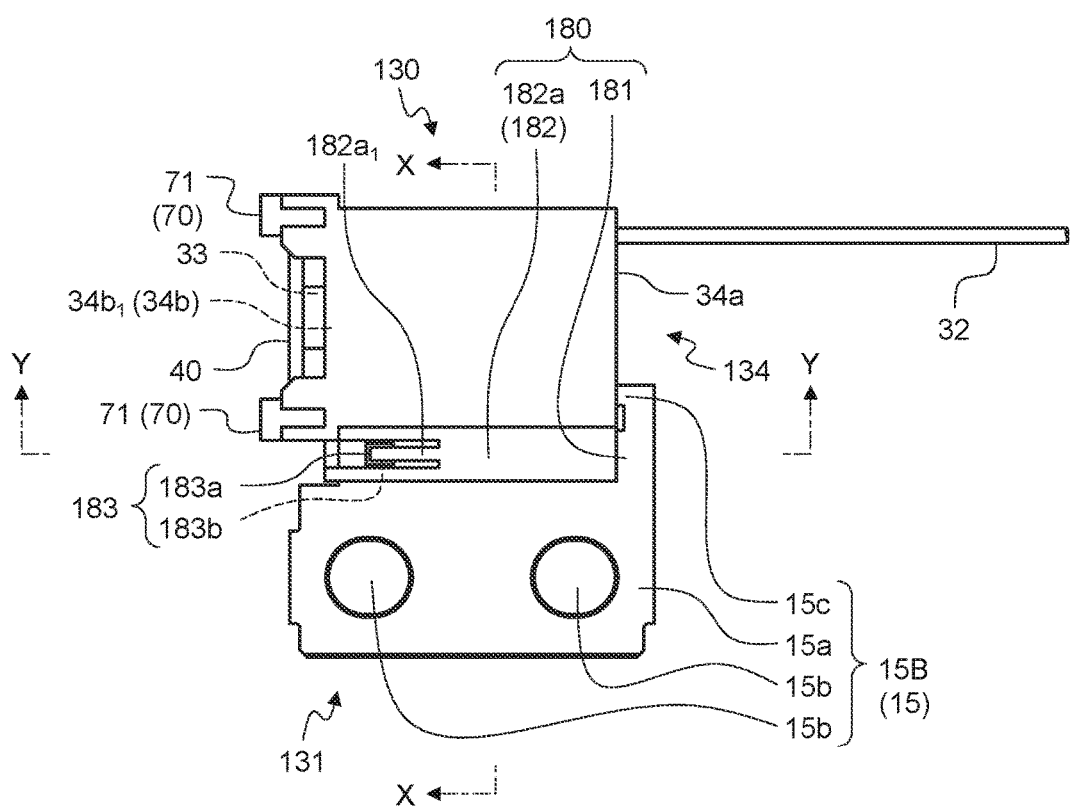
FIG. 16 is a plan view illustrating the conductive module according to the modified example.
Figure 17:
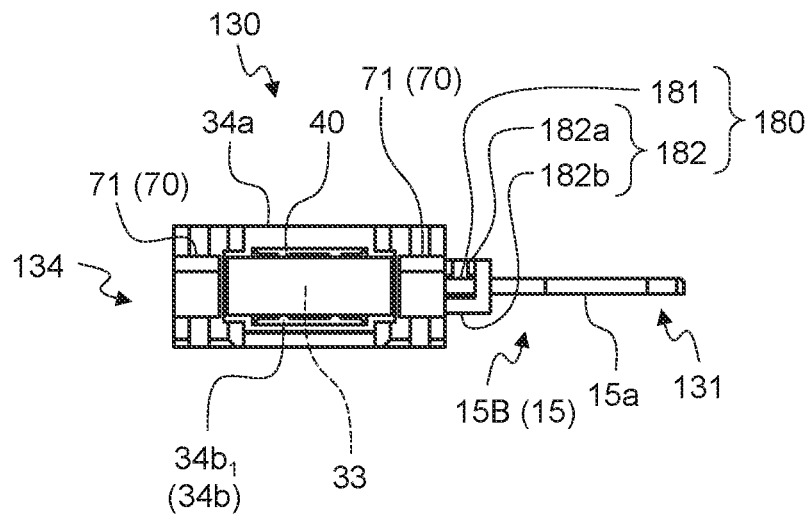
FIG. 17 is a side view of the conductive module according to the modified example as viewed from a circuit protection part side.
Figure 18:
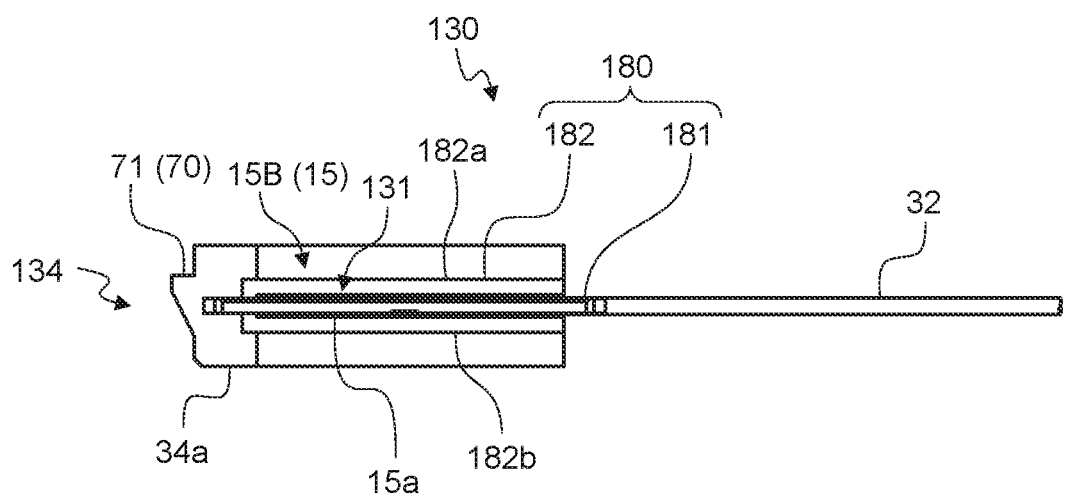
FIG. 18 is a side view of the conductive module according to the modified example viewed from a first conductive member side.
Figure 21:
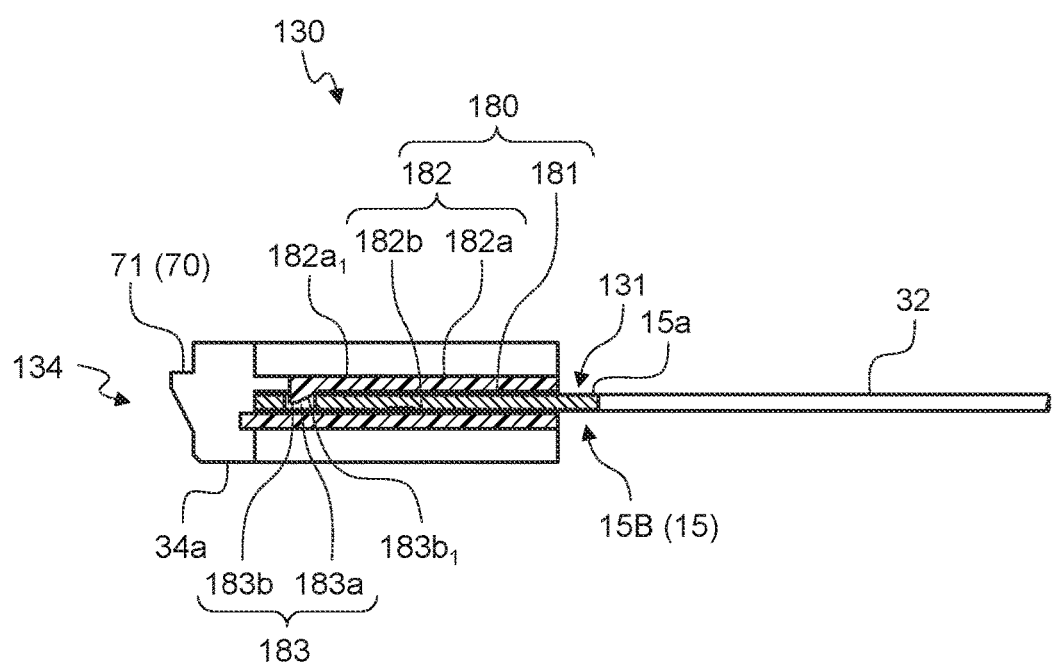
FIG. 21 is a partially enlarged view of a section taken along line Y-Y of FIG. 16.

The linking structure 180 is provided with a holding mechanism 183 to hold a housing state when the housing of the first conductive member 131 in the housing member 134 is completed (FIGS. 16 and 21). The holding mechanism 183 is provided between the first conductive member 131 and the housing member 134. In this example, a through hole 183a is provided in the side portion (the first linking engagement body 181) of the bus bar body 15a (FIGS. 19 and 21), a claw portion 183b inserted into the through hole 183a is provided in the second linking engagement body 182 (FIG. 21).

The through hole 183a in this example is formed in a rectangular shape. The through hole 183a is arranged to be close to a free end side of the electrical connection portion 15c in the side portion (the first linking engagement body 181) of the bus bar body 15a (that is, an end portion of the side portion on the insertion direction side between the first piece 182a and the second piece 182b).

Figure 15:
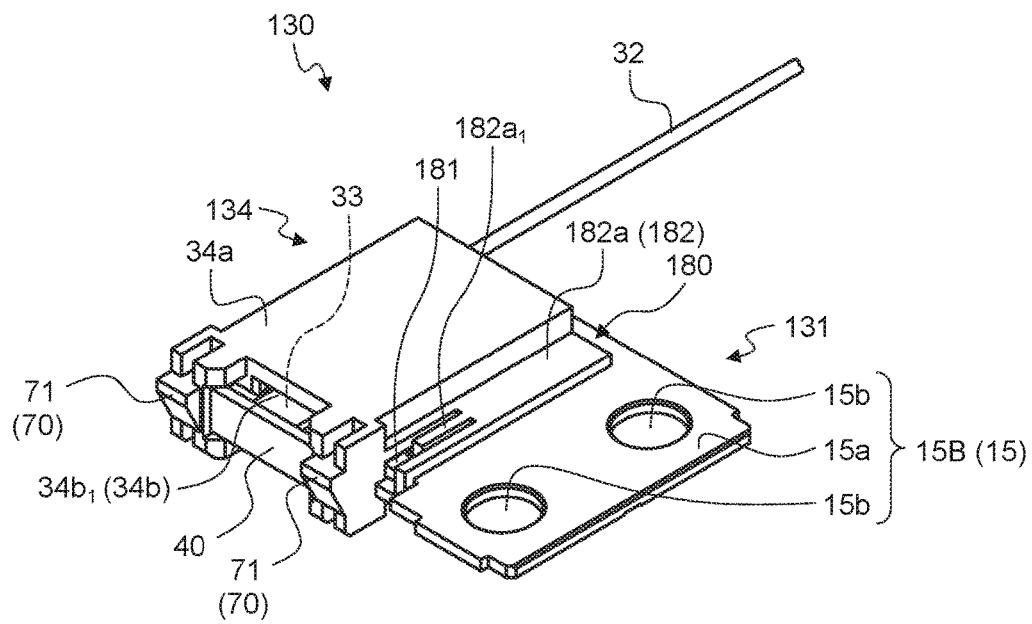
FIG. 15 is a perspective view illustrating a conductive module according to a modified example.

The claw portion 183b in this example is arranged in the first piece 182a in accordance with a position of the through hole 183a when the housing of the first conductive member 131 in the housing member 134 is completed. For example, two notches, arranged with an interval therebetween along the insertion direction between the first piece 182a and the second piece 182b of the side portion (the first linking engagement body 181) of the bus bar body 15*a* and in the direction along the reference plane in the direction orthogonal to the insertion direction, are formed in the first piece 182*a*, and a flexible piece 182*a*₁ caught by the two notches is provided (FIGS. 15, 16, and 19). The flexible piece 182*a*₁ has flexibility, and is formed such that a free end thereof is arranged on a side of openings 34*c*₁ and 34*d*₁ of the first and second connection body housing chambers 34*c* and 34*d* in the first piece 182*a*. The claw portion 183*b* protrudes from the free end of the flexible piece 182*a*₁ and is arranged between the first piece 182*a* and the second piece 182*b*.

Here, the end portion of the side portion (the first linking engagement body 181) of the bus bar body 15*a* inserted between the first piece 182*a* and the second piece 182*b* abuts on the claw portion 183*b*. The claw portion 183*b* is pushed with the flexible piece 182*a*₁ by the side portion of the bus bar body 15*a* and rides on a surface of the side portion of the bus bar body 15*a*. Thus, the claw portion 183*b* is provided with an inclined surface 183*b*₁ configured to convert a pressing force from the bus bar body 15*a* after the abutment into a force in a deflection direction of the flexible piece 182*a*₁ (FIG. 21).

In the linking structure 180, the side portion (the first linking engagement body 181) of the bus bar body 15*a* is inserted into the first connection body housing chamber 34*c* of the electrical connection portion 15*c*, and inserted between the first piece 182*a* and the second piece 182*b* while being nipped between the respective nipping portions 182*c* and 182*d*. Further, the end portion of the side portion of the bus bar body 15*a* abuts on the inclined surface 183*b*₁ of the claw portion 183*b* as the insertion progresses, in the linking structure 180. In the linking structure 180, the side portion of the bus bar body 15*a* pushes up the claw portion 183*b*, and the claw portion 183*b* rides on the surface of the side portion of the bus bar body 15*a* as the insertion further progresses. The claw portion 183*b* enters the through hole 183*a* as the deflection of the flexible piece 182*a*₁ is canceled while sliding on the surface of the side portion of the bus bar body 15*a*. In this manner, the first conductive member 131 and the housing member 134 are also linked by the linking structure 180, and thus, the rigidity therebetween can be enhanced. Further, the conductive module 130 according to the present modified example can disperse the load applied along with the external input using the point where the linking structure 180 is arranged and the portion where the linking structure using the first connection terminal 51 is arranged. Accordingly, the conductive module 130 can obtain the same effects as those of the conductive module 30 according to the embodiment, and improve the durability (anti-vibration performance) accompanying the dispersion of the load.

The conductive module according to the present embodiment is provided with a mounting structure which mounts a housing member to an insulating member being amounting target thereof, the mounting target being at least one of the insulating members which sandwich a battery cell being a connection target in an arrangement direction of a plurality of battery cells. Thus, the conductive module can complete the mounting to a battery module (aggregate of the plurality of battery cells) while securing strength against external input, for example, without intervention of a case which an additional member as that in the related art. Accordingly, this conductive module can achieve the miniaturization of the size of the battery pack. In addition, a battery pack according to the present invention includes such a conductive module, and thus, it is possible to miniaturize a size thereof.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery pack comprising:
 a plurality of insulating members that sandwich each of a plurality of arranged battery cells individually in an arrangement direction of the plurality of battery cells;
 a first conductive member that is electrically connected to at least one battery cell of the plurality of arranged battery cells as a connection target by being directly or indirectly mounted to one of two electrode terminals included in the battery cell being the connection target;
 a second conductive member that electrically connects an arithmetic processing device of a battery monitoring unit to the first conductive member, the battery monitoring unit monitoring a battery state of the battery cell;
 a circuit protection member that includes a first electrical connection portion electrically connected to an electrical connection portion of the first conductive member, a second electrical connection portion electrically connected to an electrical connection portion of the second conductive member, and a fuse element arranged between the first electrical connection portion and the second electrical connection portion;
 a first electrical connection structural body that electrically connects the electrical connection portion of the first conductive member and the first electrical connection portion between the first conductive member and the circuit protection member;
 a second electrical connection structural body that electrically connects the electrical connection portion of the second conductive member and the second electrical connection portion between the second conductive member and the circuit protection member;
 a housing member that houses the circuit protection member, the first electrical connection structural body, and the second electrical connection structural body; and
 a mounting structure that mounts the housing member to the insulating member being a mounting target, the mounting target being at least one of the insulating members sandwiching the battery cell being the connection target, wherein
 the battery cell and the insulating member are alternately arranged along the arrangement direction of the plurality of battery cells,
 the insulating member covers a main wall surface of the battery cell that opposes the insulating member in the arrangement direction of the plurality of battery cells, the insulating member being the mounting target has a battery-side engagement body, and
 the mounting structure includes a conductor-side engagement body which is an engagement body provided in the housing member, and is engaged with the battery-side engagement body to mount the housing member to the insulating member.

2. The battery pack according to claim 1, wherein one of the conductor-side engagement body and the battery-side engagement body is formed as a protruding body, and the other of the conductor-side engagement body and the battery-side engagement body is formed as a locking body that suppresses relative movement in a removal direction between the housing member and the insulating member by locking the protruding body.

3. The battery pack according to claim 1, wherein
the circuit protection member is provided as a circuit protection part enclosing each of the first electrical connection portion and the second electrical connection portion, in the state of being exposed, in an insulating enclosing member, and
the housing member includes a protection body housing chamber in which the circuit protection part is housed.

4. The battery pack according to claim 2, wherein
the circuit protection member is provided as a circuit protection part enclosing each of the first electrical connection portion and the second electrical connection portion, in the state of being exposed, in an insulating enclosing member, and
the housing member includes a protection body housing chamber in which the circuit protection part is housed.

5. The battery pack according to claim 1, further comprising:
a linking structure that links the first conductive member and the housing member.

6. The battery pack according to claim 2, further comprising:
a linking structure that links the first conductive member and the housing member.

7. The battery pack according to claim 3, further comprising:
a linking structure that links the first conductive member and the housing member.

8. The battery pack according to claim 4, further comprising:
a linking structure that links the first conductive member and the housing member.

9. The battery pack according to claim 1, wherein
the battery cell is held in a state of being sandwiched between two insulating members.

* * * * *